US012704877B2

(12) United States Patent
Kishimoto et al.

(10) Patent No.: US 12,704,877 B2
(45) Date of Patent: Aug. 11, 2026

(54) ELECTRONIC DEVICE

(71) Applicant: Samsung Display Co., Ltd., Yongin-si (KR)

(72) Inventors: Hirotsugu Kishimoto, Hwaseong-si (KR); Dasom Gu, Asan-si (KR); Jaiku Shin, Hwaseong-si (KR); Yonghyuck Lee, Cheonan-si (KR); Hongkwan Lee, Yongin-si (KR); Yongchan Jeon, Cheonan-si (KR); Chul Ho Jeong, Seoul (KR); Hyunjun Cho, Seoul (KR); Sohra Han, Cheonan-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 799 days.

(21) Appl. No.: 17/965,104

(22) Filed: Oct. 13, 2022

(65) Prior Publication Data

US 2023/0229194 A1 Jul. 20, 2023

(30) Foreign Application Priority Data

Jan. 17, 2022 (KR) ........................ 10-2022-0006867

(51) Int. Cl.
*G06F 1/16* (2006.01)

(52) U.S. Cl.
CPC .......... *G06F 1/1643* (2013.01); *G06F 1/1616* (2013.01); *G06F 1/1652* (2013.01); *G06F 1/1656* (2013.01)

(58) Field of Classification Search
CPC .... G06F 1/1616; G06F 1/1637; G06F 1/1641; G06F 1/1643; G06F 1/1652;
(Continued)

(56) References Cited

U.S. PATENT DOCUMENTS

| | | | |
|---|---|---|---|
| 10,930,883 | B2 | 2/2021 | Park |
| 10,976,873 | B2 | 4/2021 | Shin et al. |
| 11,513,645 | B2 | 11/2022 | Shin et al. |
| 11,612,065 | B2 | 3/2023 | Wu |

(Continued)

FOREIGN PATENT DOCUMENTS

| | | | |
|---|---|---|---|
| CN | 112991959 | A | 6/2021 |
| KR | 1020190124844 | A | 11/2019 |
| KR | 1020200084495 | A | 7/2020 |
| KR | 20210000359 | A | 1/2021 |
| KR | 1020210061604 | A | 5/2021 |

*Primary Examiner* — Amr A Awad
*Assistant Examiner* — Aaron Midkiff
(74) *Attorney, Agent, or Firm* — CANTOR COLBURN LLP

(57) ABSTRACT

An electronic device includes a display panel including a folding area and a non-folding area which is adjacent to the folding area. and a digitizer which faces the display panel, senses a first external input and is foldable together with the display panel. The digitizer includes a substrate including a folding portion corresponding to the folding area of the display panel, the folding portion defining a plurality of openings of the substrate corresponding to the folding area of the display panel, a support portion which corresponds to the non-folding area of the display panel, and a reinforced fiber, and a first conductive pattern layer and a second conductive pattern layer each corresponding to the support portion of the substrate, the first conductive pattern layer and the second conductive pattern layer facing each other with the substrate therebetween.

20 Claims, 20 Drawing Sheets

(58) Field of Classification Search

CPC .... G06F 1/1656; G06F 1/1677; G06F 1/1681; G06F 3/0412; G06F 3/0445; G06F 3/0446; G06F 3/046; G06F 2203/04102; G06F 2203/04103; G06F 2203/04112; G06F 1/1647; G06F 2203/04111; G06F 3/041–04897; G06F 2203/041–04809; G06F 1/16–1698; G06F 1/1633; G06F 3/04164; G06F 2203/041127; G09F 9/301; B32B 5/26; B32B 2260/046; B32B 2262/101; B32B 2262/106; C08J 5/243; H05K 1/02578; H05K 1/028; H05K 1/03–0393; H05K 1/0278; H05K 1/0366

See application file for complete search history.

(56) References Cited

U.S. PATENT DOCUMENTS

| | | | | |
|---|---|---|---|---|
| 2012/0011716 | A1* | 1/2012 | Kim | H05K 1/0265<br>29/852 |
| 2015/0029652 | A1* | 1/2015 | Min | H05K 1/0278<br>361/679.27 |
| 2016/0291780 | A1* | 10/2016 | Namkung | G06F 3/0412 |
| 2019/0132947 | A1* | 5/2019 | Koo | H05K 1/0281 |
| 2020/0212338 | A1* | 7/2020 | Ha | H10K 50/841 |
| 2021/0240326 | A1* | 8/2021 | Chou | G06F 3/0412 |
| 2022/0129094 | A1* | 4/2022 | Tatsuno | G06F 1/1677 |
| 2022/0147107 | A1* | 5/2022 | Wang | G06F 1/1616 |
| 2022/0399521 | A1* | 12/2022 | Kang | B32B 15/20 |

* cited by examiner

DD
WM
DM
DGT
HC
WP
PIT
AL1
WIN
AL2
POL
AL3
EP
AL4
PPL
AL5
CL1
BS
CL2
SHL
AS
NFA2
FA
NFA1
OP
CL1-2
BS2
CL2-2
SA2
SHL2
CUL2
CL1-1
BS1
CL2-1
SA1
SHL1
CUL1
AS
DR2
DR3
DR1

CL1: CL1-1, CL1-2
CL2: CL2-1, CL2-2
BS: BS1, BS2

SA2
SA1
BS
SPL1
SPL2
IL1-2
MX1
FB1-1
FB1-2
IL2-2
I'
CL1-2
CL2-2
COT1-2
COL1-2
COL2-2
OP
COL1-1
COL2-1
COT1-1
CL1-1
CL2-1
I
IL1-1
IL2-2
DGT: SA1, SA2
DR2
DR3
DR1

ELECTRONIC DEVICE

This application claims priority to Korean Patent Application No. 10-2022-0006867, filed on Jan. 17, 2022, and all the benefits accruing therefrom under 35 U.S.C. § 119, the contents of which are hereby incorporated by reference in its entirety.

BACKGROUND

1. Field

The present disclosure relates to an electronic device. More particularly, the present disclosure relates to a foldable electronic device.

2. Description of the Related Art

Multimedia electronic devices, such as televisions, mobile phones, tablet computers, computers, navigation devices, and game devices, include a display panel displaying an image and an input sensor sensing an external input.

With the technological development of the electronic device, various types of flexible electronic devices are being developed. For example, various flexible electronic devices, which are foldable, rollable, or capable of being transformed into a curved shape, are being developed. The flexible electronic devices are easy to carry and improve a convenience of transporting and using the electronic device. Stacked members included in the flexible electronic device have sufficient mechanical properties while being easy to fold or bend, as well as being lightweight to further improve a convenience of transportation and using thereof.

SUMMARY

The present disclosure provides an electronic device with improved strength and lightweight.

The present disclosure provides an electronic device with simplified stack structure, reduced thickness, reduced manufacturing cost, and improved folding reliability.

An embodiment provides an electronic device including a display panel including a folding area foldable with respect to a folding axis extending in one direction, a first non-folding area, and a second non-folding area spaced apart from the first non-folding area with the folding area interposed therebetween, and a digitizer under the display panel and sensing a first external input. The digitizer includes a substrate including a folding portion overlapping the folding area and provided with a plurality of openings defined therethrough, a first support portion, and a second support portion spaced apart from the first support portion with the folding portion interposed therebetween, first conductive patterns on one surface of the substrate, and second conductive patterns on the other surface of the substrate. The substrate includes a reinforced fiber.

The substrate may further include a matrix portion including a polymer, and the reinforced fiber is dispersed in the matrix portion.

The substrate may further include an inorganic material dispersed in the matrix portion.

The substrate may further include a black pigment or a black dye dispersed in the matrix portion.

The substrate may have a thickness equal to or greater than about 100 micrometers and equal to or smaller than about 300 micrometers.

The substrate may have a flexural modulus equal to or greater than about 20 gigapascals (GPa) and equal to or smaller than about 45 GPa.

The substrate may include first reinforced fibers extending in a first direction and second reinforced fibers extending in a second direction crossing the first direction, and the first reinforced fibers cross the second reinforced fibers when viewed in a plane.

The substrate may include a plurality of sub-substrates stacked in a thickness direction, and each of the sub-substrates may include the first reinforced fibers and the second reinforced fibers.

The openings are arranged in a lattice shape when viewed in a plane.

The folding portion in the digitizer which is folded may include a first curved portion having a first curvature with respect to a first center of curvature facing an upper surface of the substrate, a second curved portion between the first curved portion and the first support portion and having a second curvature with respect to a second center of curvature facing a lower surface of the substrate, and a third curved portion between the first curved portion and the second support portion and having a third curvature with respect to a third center of curvature facing the lower surface of the substrate.

The first curvature may be greater than the second curvature.

The digitizer may further include first and second insulating patterns covering the first conductive patterns and spaced apart from each other with the openings interposed therebetween, and third and fourth insulating patterns covering the second conductive patterns and spaced apart from each other with the openings interposed therebetween, and the first and third insulating patterns overlap the first support portion, and the second and fourth insulating patterns overlap the second support portion.

The digitizer may further include a first insulating layer covering the first conductive patterns and a second insulating layer covering the second conductive patterns, and each of the first insulating layer and the second insulating layer may be provided with a plurality of insulating openings overlapping the openings.

The electronic device may further include a sub-digitizer spaced apart from the digitizer and sensing the first external input, and the sub-digitizer may overlap the folding area.

The electronic device may further include an input sensor on the digitizer and sensing a second external input different from the first external input.

An embodiment provides an electronic device including a display panel including a folding area folded with respect to a folding axis extending in one direction, a first non-folding area, and a second non-folding area spaced apart from the first non-folding area with the folding area interposed therebetween, a digitizer under the display panel, and a sub-digitizer overlapping the folding area and spaced apart from the digitizer. The digitizer includes a substrate including a reinforced fiber, first conductive patterns on one surface of the substrate, and second conductive patterns on the other surface of the substrate. The sub-digitizer includes an input sensing layer including a plurality of coils and a support layer supporting the input sensing layer.

The support layer may include a plurality of plates, and the plates are arranged on a same layer in a direction crossing the one direction and support the input sensing layer.

The sub-digitizer may include a plurality of auxiliary digitizers spaced apart from each other, and each of the auxiliary digitizers may include a sub-sensing portion including a plurality of coils and a plate supporting the sub-sensing portion, and the auxiliary digitizers may be arranged in a direction crossing the one direction.

The substrate in the digitizer which is bent may include a plurality of curved surfaces bent with different curvatures from each other.

The substrate may be provided with a plurality of openings overlapping the folding area, and the sub-digitizer may overlap the openings when viewed in a plane.

According to the above, the digitizer of the electronic device is formed (or provided) on the substrate including the reinforced fiber, and thus, a flexibility and a rigidity of the digitizer and the electronic device are improved.

According to the above, the digitizer is formed (or provided) on the substrate including the reinforced fiber, and thus, a heat generated from the digitizer is efficiently dissipated.

According to the above, as the electronic device includes the display panel and the digitizer, which have a simplified stack structure, a thickness and a weight of the electronic device are reduced while the folding reliability of the electronic device is maintained.

BRIEF DESCRIPTION OF THE DRAWINGS

The above and other advantages of the present disclosure will become readily apparent by reference to the following detailed description when considered in conjunction with the accompanying drawings where.

DETAILED DESCRIPTION

Figure 1A:
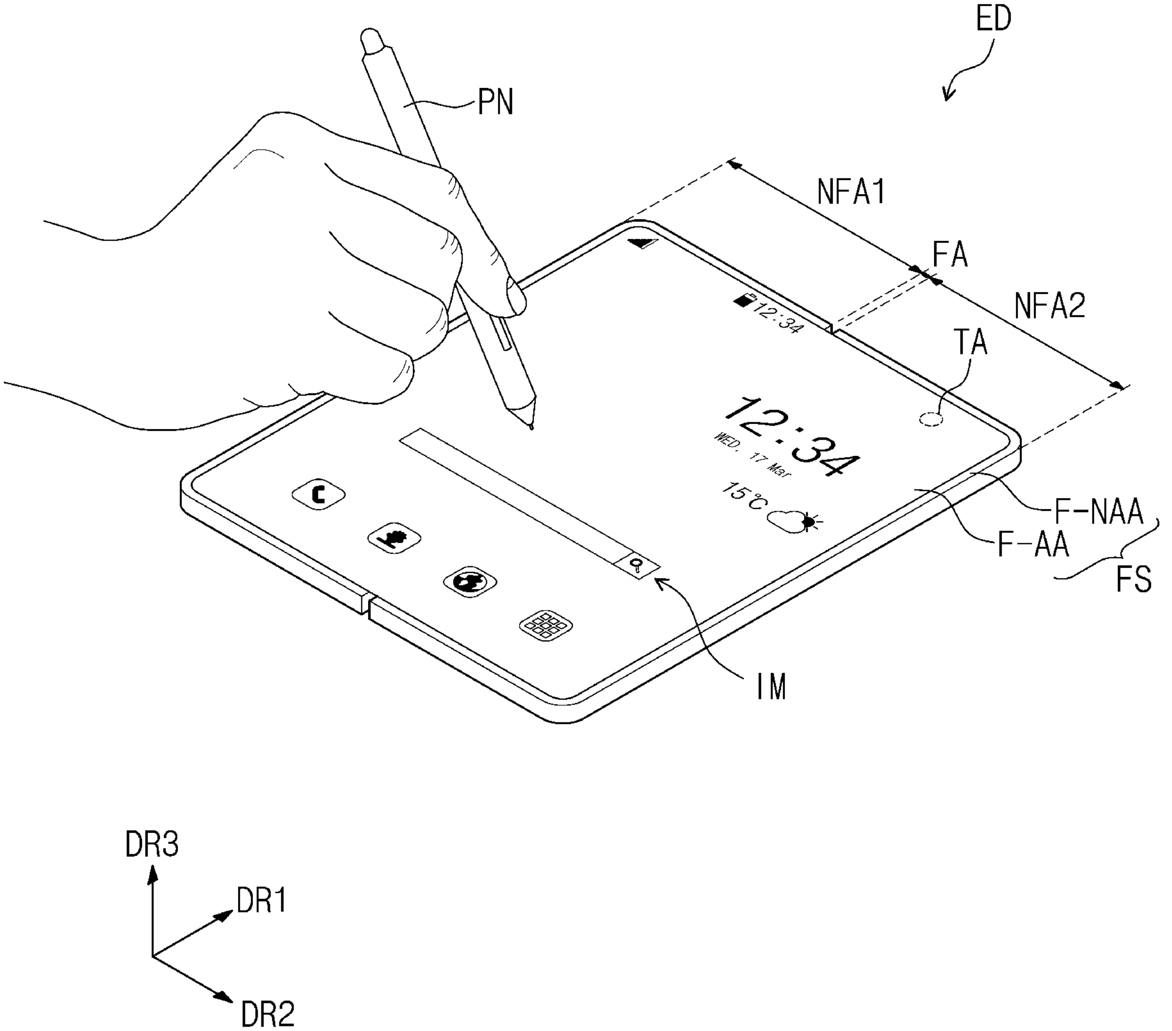
FIGS. 1A to 1D are perspective views of an electronic device according to an embodiment of the present disclosure.

The present disclosure may be variously modified and realized in different forms, and thus specific embodiments will be exemplified in the drawings and described in detail hereinbelow. Flo ever the present disclosure should not be limited to the specific disclosed forms, and be construed to include all modifications, equivalents, or replacements included in the spirit and scope of the present disclosure.

In the present disclosure, it will be understood that when an element (or area, layer, or portion) is referred to as being "on", "connected to" or "coupled to" another element or layer, it can be directly on, connected or coupled to the other element or layer or intervening elements or layers may be present. In contrast, when an element (or area, layer, or portion) is referred to as being "directly on", "directly connected to" or "directly coupled to" another element or layer, no intervening element is present therebetween. As being related 'directly,' elements may be in physical contact such as to form an interface therebetween.

Like numerals refer to like elements throughout. As used herein, a reference number may indicate a singular element or a plurality of the element. For example, a reference number labeling a singular form of an element within the drawing figures may be used to reference a plurality of the singular element within the text of specification.

In the drawings, the thickness, ratio, and dimension of components are exaggerated for effective description of the technical content.

As used herein, the singular forms, "a", "an" and "the" are intended to include the plural forms as well, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" may include any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure.

Spatially relative terms, such as "beneath", "below", "lower", "above", "upper" and the like, may be used herein for ease of description to describe one element or feature's relationship to another elements or features as shown in the figures.

It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the present disclosure will be described with reference to accompanying drawings.

Figure 1B:
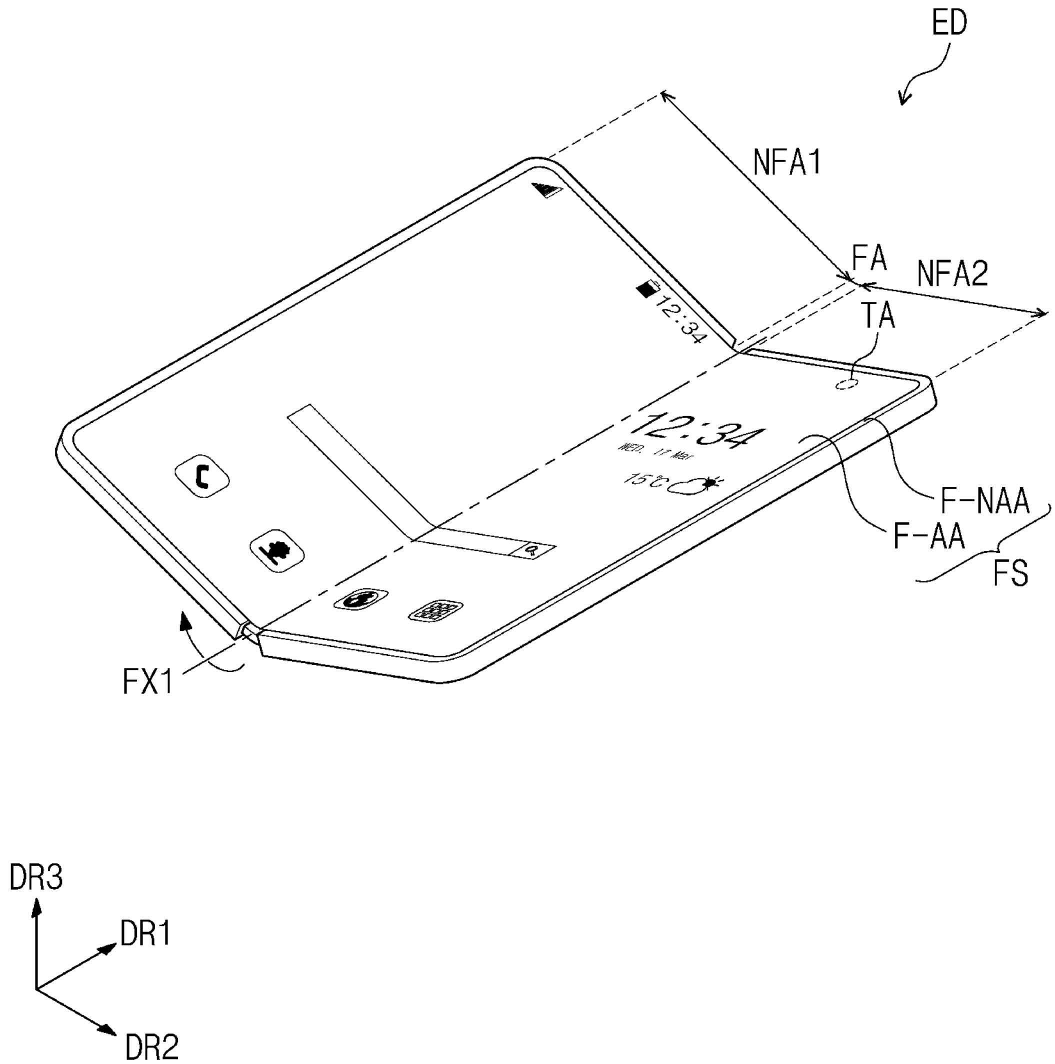
Figure 1C:
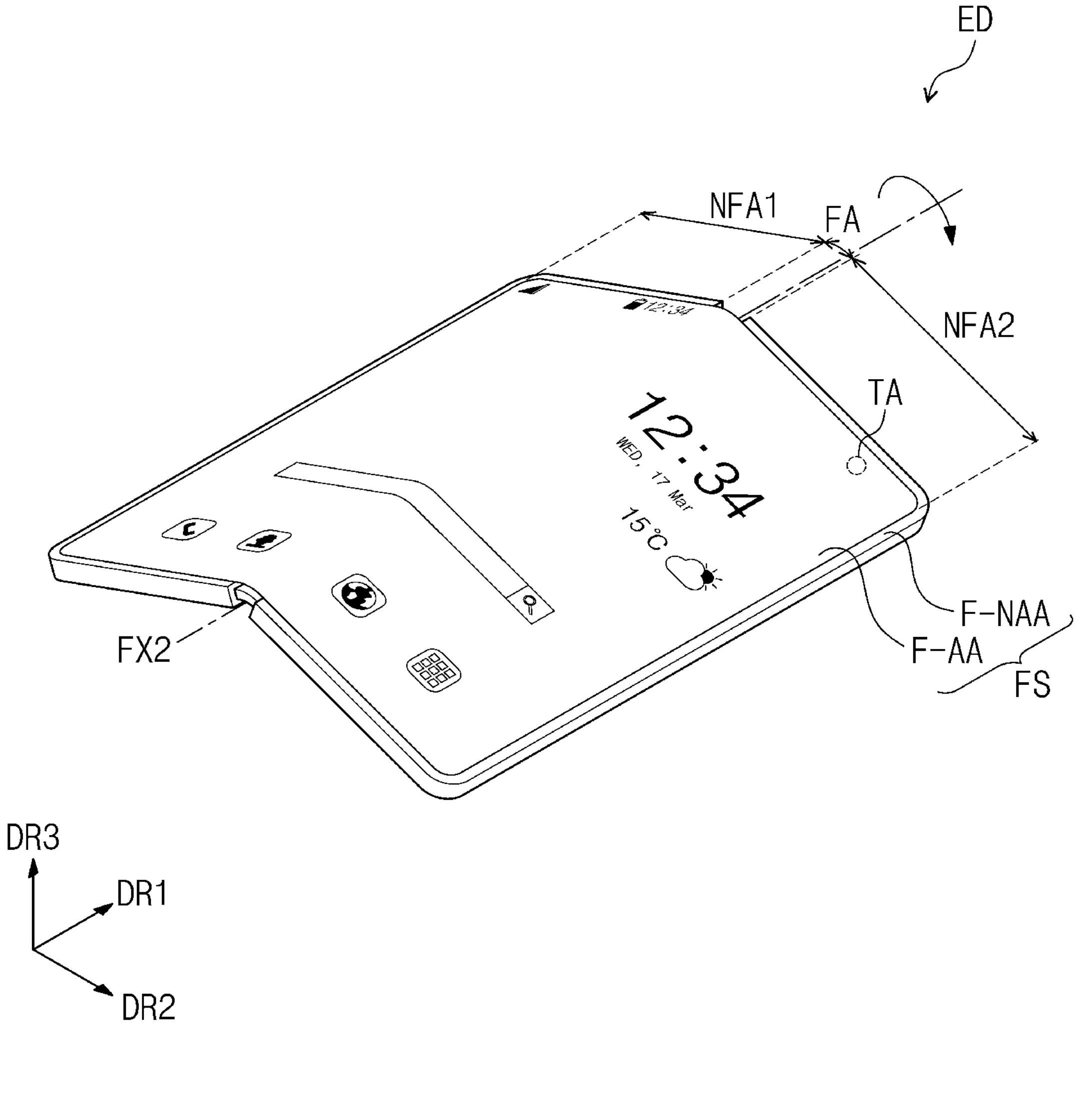
Figure 1D:
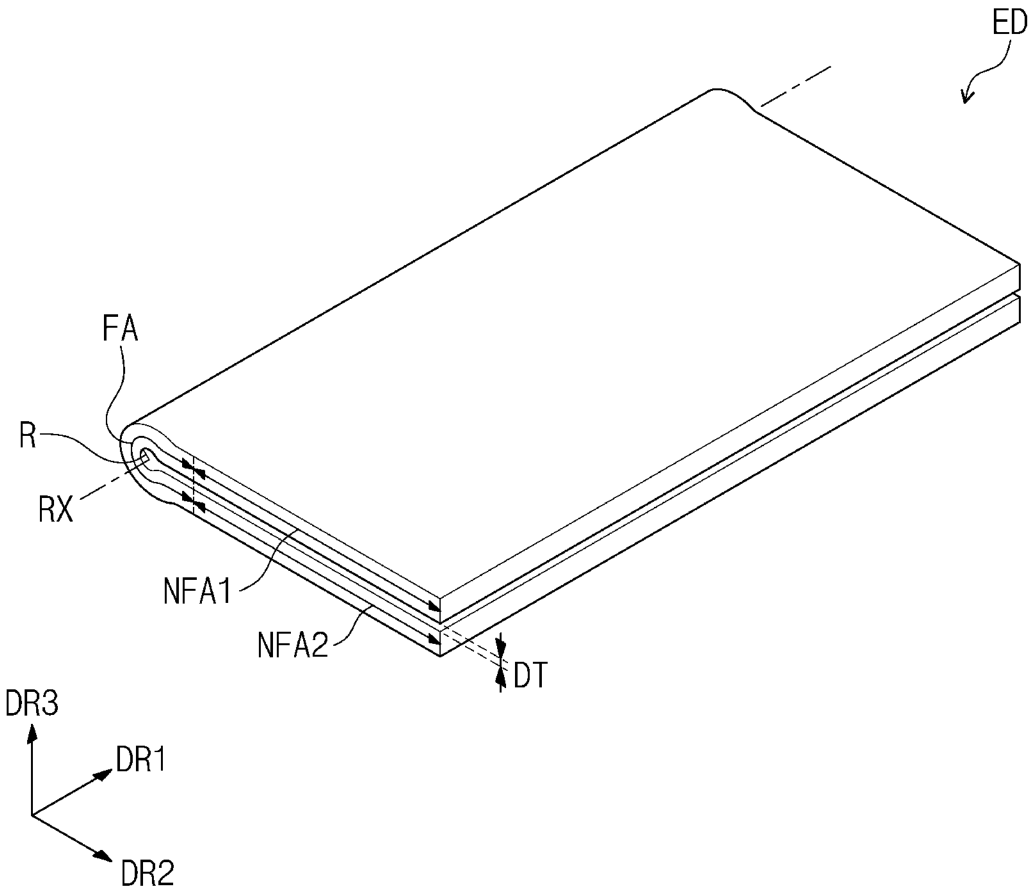

FIGS. 1A to 1D are perspective views of an electronic device ED according to an embodiment of the present disclosure. FIG. 1A is a perspective view showing the electronic device ED which is unfolded (e.g., in an unfolded state). FIGS. 1B and 1C are perspective views showing the electronic device ED which is partially folded (e.g., in a folded state), and FIG. 1D is a perspective view showing the electronic device ED which is completely folded (e.g., in a folded state).

The electronic device ED may be activated in response to electrical signals and may display an image IM. As an example, the electronic device ED may be applied to a large-sized electronic item, such as a television set, an outdoor billboard, etc., and a small and medium-sized electronic item, such as a monitor, a mobile phone, a tablet computer, a computer, a navigation device, a game device, etc. However, these are merely examples, and the electronic device ED may be applied to other electronic devices as long as they do not depart from the concept of the present disclosure. In the present embodiment, the mobile phone is shown as an example of the electronic device ED.

The electronic device ED of the present disclosure may be flexible. The term "flexible" used herein refers to the property of being able to be bent (e.g., bendable) from a structure that is completely bent to a structure that is partially bent at the scale of a few nanometers. For example, the electronic device ED may be a curved electronic device or a foldable electronic device. In the present embodiment, the foldable electronic device will be described as a representative example of the flexible electronic device ED.

Referring to FIG. 1A, the electronic device ED may have a rectangular shape defined by sides extending in (or along) a first direction DR1 and a second direction DR2. However, the shape of the electronic device ED should not be limited to the rectangular shape, and the electronic device ED may have a variety of shapes, such as a circular shape and a polygonal shape when viewed in a plane.

The electronic device ED may display the image IM through a display surface FS parallel to each of the first direction DR1 and the second direction DR2, toward a third direction DR3. The display surface FS through which the image IM is displayed may correspond to a front surface of the electronic device ED. The image IM provided from the electronic device ED may include a still image as well as a moving image such as a video. FIG. 1A shows a clock widget and application icons as a representative example of the image IM.

Front (or upper) and rear (or lower) surfaces of each member of the electronic device ED may be opposite to each other in the third direction DR3, and a normal line direction of each of the front and rear surfaces may be substantially parallel to the third direction DR3. A separation distance between the front and rear surfaces of each member (or each unit) in the third direction DR3 may correspond to a thickness in the member (or the unit). A thickness direction of the electronic device ED and various components or layers thereof may be defined along the third direction DR3.

In the present disclosure, the expression "when viewed in a plane" may mean a state of being viewed in the third direction DR3, that is, a view of a plane defined by the first direction DR1 and the second direction DR2 crossing each other. In the present disclosure, the expression "on a cross-section" may mean a state of the third direction DR3 being viewed in the first direction DR1 and/or the second direction DR2. Directions indicated by the first, second, and third directions DR1, DR2, and DR3 are relative to each other, and thus, the directions indicated by the first, second, and third directions DR1, DR2, and DR3 may be changed to other directions.

The display surface FS of the electronic device ED may include a display area F-AA and a peripheral area F-NAA. The display area F-AA may be an area in which the image IM is displayed, and the peripheral area F-NAA may be an area in which the image IM is not displayed (e.g., non-display region or area). The peripheral area F-NAA may have a light transmittance lower than that of the display area F-AA and may have a predetermined color which lowers the light transmittance as compared to the display area F-AA.

The peripheral area F-NAA may be defined adjacent to the display area F-AA. The display area F-AA may have a shape (e.g., a planar shape or area) substantially defined by the peripheral area F-NAA. As an example, the peripheral area F-NAA may surround the display area F-AA, however, this is merely an example. The peripheral area F-NAA may be defined adjacent to only one side of the display area F-AA. In an embodiment, the peripheral area F-NAA may be defined at a side surface extending from the front surface rather than the front surface of the electronic device ED. According to an embodiment, the peripheral area F-NAA may be omitted.

The display area F-AA may include a signal transmission area TA. The signal transmission area TA may be provided as a portion of the display area F-AA, such that a planar area of the signal transmission area TA is within an overall planar area of the display area F-AA. Accordingly, some pixels PX may be arranged in the signal transmission area TA, and the electronic device ED may display the image IM through the signal transmission area TA as a display region.

FIG. 1A shows a structure in which the signal transmission area TA is defined in the display area F-AA as a representative example, however, the present disclosure should not be limited thereto or thereby. The signal transmission area TA may be included in the peripheral area F-NAA or may be surrounded by each of the display area F-AA and the peripheral area F-NAA (e.g., be a planar area except for the display area F-AA and the peripheral area F-NAA). In addition, FIG. 1A shows one signal transmission area TA as a representative example, however, the present disclosure should not be limited thereto or thereby. According to an embodiment, the signal transmission area TA may be provided as a plurality of areas spaced apart from each other.

An electronic module of the electronic device ED may be disposed to correspond to the signal transmission area TA. The electronic module may provide a function of the electronic device ED, such as by using light, sound, pressure, temperature, proximity of an input, etc. As an example, the electronic module may be provided as a camera module CMM, a distance measurement sensor module such as a proximity sensor, a biometric sensor module that recognizes a part of a body (e.g., a fingerprint, an iris, or a face), a lamp that outputs light, etc., however, should not be particularly limited.

The electronic module may receive an external input provided through the signal transmission area TA and/or may provide an output through the signal transmission area TA. As an example, when the camera module CMM is employed as the electronic module, the camera module CMM may take a picture of an external object using a visible light traveling through the signal transmission area TA. When the proximity sensor module is employed as the electronic module, the proximity sensor module may determine an approach of the external object using an infrared light traveling through the signal transmission area TA.

The electronic device ED may sense the external input applied thereto from the outside (e.g., outside of the electronic device ED). The external input may include a variety of external inputs provided from the outside of the electronic device ED. For example, the external inputs may include force, pressure, temperature, light, etc. The external inputs may include an external input (e.g., a hovering input) applied when in close proximity to or approaching close to the electronic device ED at a predetermined distance as well as a touch input (e.g., touch input caused by contact of an input tool such as a body part (hand of a user) or a pen PN).

In the present embodiment, among the external inputs, the touch input caused by a pen PN and applied to the front surface of the electronic device ED is shown as a representative example. The electronic device ED may include an input sensor, e.g., a digitizer, which is driven by an electromagnetic resonance (EMR) method or an input sensor driven by a capacitance method, however, should not be particularly limited. In addition, an area where the external input is sensed in the electronic device ED should not be limited to the front surface of the electronic device ED, and the electronic device ED may sense a user's input applied to a side surface or a rear surface of the electronic device ED according to a structure of the electronic device ED.

The electronic device ED may include a folding area FA and a non-folding area provided in plural including a plurality of non-folding areas NFA1 and NFA2. The electronic device ED shown in FIG. 1A may include a first non-folding area NFA1 and a second non-folding area NFA2. The folding area FA may be disposed between the first non-folding area NFA1 and the second non-folding area NFA2. The first non-folding area NFA1, the folding area FA, and the second non-folding area NFA2 of the electronic device ED may be arranged in order along the second direction DR2 in an unfolded state of the electronic device ED.

The folding area FA may be a flat area in the electronic device ED which is unfolded, or a curved area with a predetermined curvature in the electronic device ED which folded, according to a folding operation of the electronic device ED. The first and second non-folding areas NFA1 and NFA2 may be flat in the folded and unfolded states of the electronic device ED. As shown in FIG. 1A, when the electronic device ED is in the unfolded state, the folding area FA and the first and second non-folding areas NFA1 and NFA2 may be flat. That is, the electronic device ED which is unfolded may dispose the folding area FA and the first and second non-folding areas NFA1 and NFA2 coplanar with each other.

The electronic device ED may be folded with respect to an imaginary folding axis (hereinafter, referred to as a folding axis) extending in one direction. As an example, as shown in FIGS. 1B and 1C, the electronic device ED may be respectively folded with respect to folding axes FX1 and FX2 extending in the first direction DR1. The folding axes FX1 and FX2 may extend in a direction substantially parallel to long sides of the electronic device ED, however, should not be limited thereto or thereby. The folding axes FX1 and FX2 may extend in a direction substantially parallel to short sides of the electronic device ED according to the structure of the electronic device ED.

The electronic device ED may be foldable at a predetermined angle with respect to the folding axes FX1 and FX2. FIG. 1B shows the electronic device ED that is inwardly folded (an in-folding state) at the predetermined angle, and FIG. 1C shows the electronic device ED that is outwardly folded (an out-folding state) at the predetermined angle.

Referring to FIG. 1B, a first folding axis FX1 may be defined on (or at) the front surface of the electronic device ED. When the electronic device ED is folded with respect to the first folding axis FX1, a portion of the display surface FS which corresponds to the first non-folding area NFA1, may face a portion of the display surface FS which corresponds to the second non-folding area NFA2, and this folding state may be defined as the in-folding state. In the in-folding state, a portion of the display surface FS, which corresponds to the folding area FA of the electronic device ED, may be foldable to form a concavely curved surface facing the first folding axis FX1.

Referring to FIG. 1C, a second folding axis FX2 may be defined on (or at) the rear surface of the electronic device ED which is opposite to the front surface thereof. When the electronic device ED is folded with respect to the second folding axis FX2, the display surfaces FS corresponding to the first and second non-folding areas NFA1 and NFA2 may be exposed to the outside (e.g., face in directions away from each other), and this folding state may be defined as the out-folding state. In the out-folding state, a portion of the display surface FS corresponding to the folding area FA of the electronic device ED may be opposite to the second folding axis FX2 and may be folded to form a convexly curved surface. The display area F-AA of the outwardly folded electronic device ED may be exposed to the outside, and the image IM may be viewable from outside the electronic device ED in the folded state.

Referring to FIG. 1D, when the electronic device ED is inwardly and completely folded, the first and second non-folding areas NFA1 and NFA2 may overlap each other and may face each other when viewed in a plane. Accordingly, the display surface FS (refer to FIG. 1A) corresponding to the front surface of the electronic device ED may not be exposed to the outside.

Referring to FIG. 1D, when the electronic device ED is completely inwardly folded (complete in-folding), at least a portion of the folding area FA may have a predetermined curvature. The folding area FA may be folded at a predetermined radius of curvature R with respect to a center of curvature RX facing the folding area FA in the in-folding state. According to an embodiment, the radius of curvature R may be greater than a distance DT between the first non-folding area NFA1 and the second non-folding area NFA2 along a thickness direction of the electronic device ED which is folded. Accordingly, when viewed in the first direction DR1, the folding area FA may be folded with a dumbbell shape formed at the folding area FA. In an embodiment, the center of curvature RX may correspond to a respective folding axis, without being limited thereto.

The electronic device ED may be provided to be foldable in only one operation between an in-folding operation and an out-folding operation, from an unfolding operation (e.g., unfolded state) with respect to one folding axis. In an embodiment, the electronic device may be foldable in both the in-folding operation and the out-folding operation, from the unfolding operation, however, the present disclosure should not be particularly limited. In addition, the electronic device ED is foldable with respect to one folding axis in the present embodiment, however, the number of the folding axes defined in the electronic device ED should not be limited thereto or thereby. In an embodiment, the electronic device ED may be folded (e.g., foldable) with respect to a plurality of folding axes.

Figure 2:
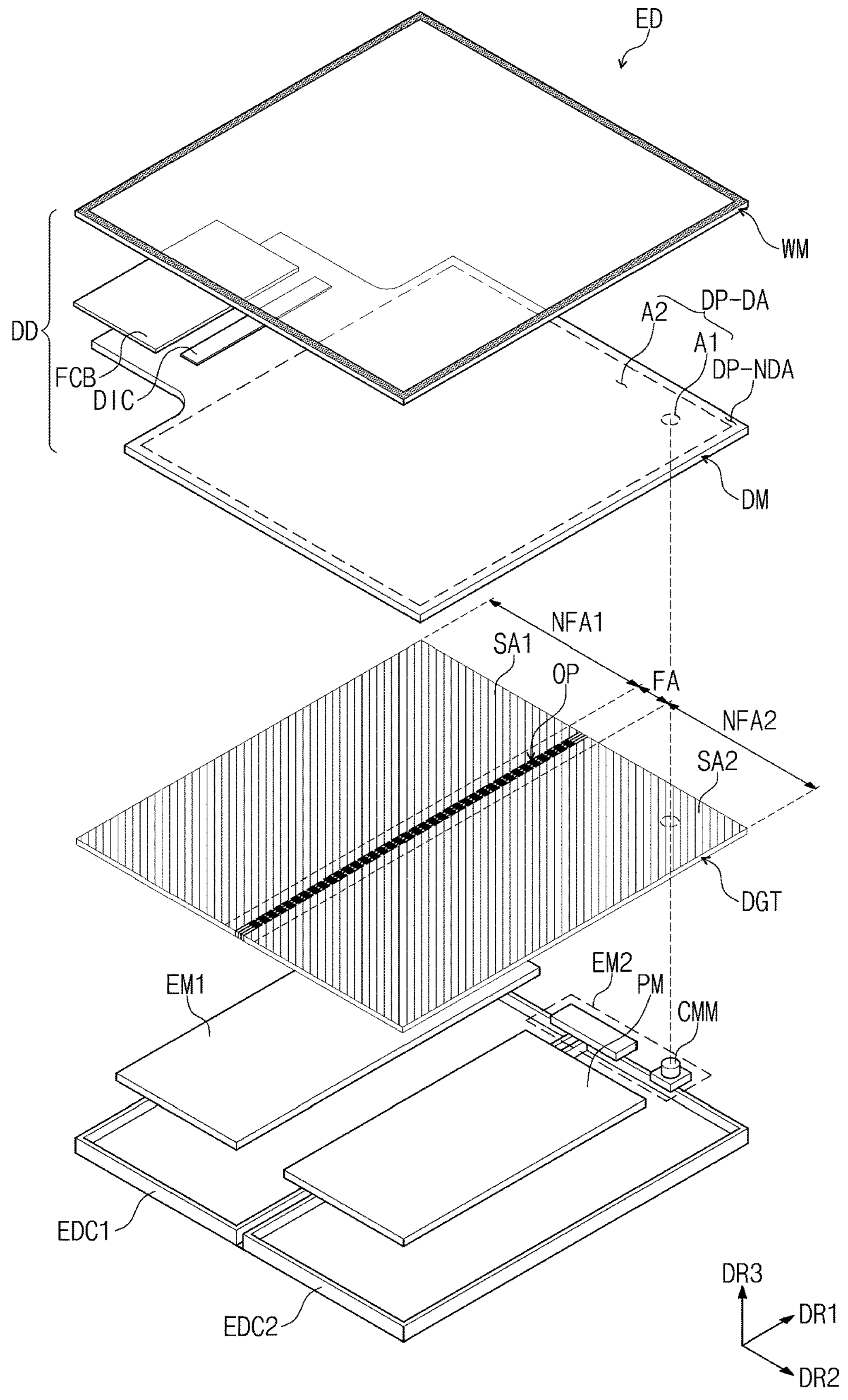
FIG. 2 is an exploded perspective view of an electronic device according to an embodiment of the present disclosure.
Figure 3:
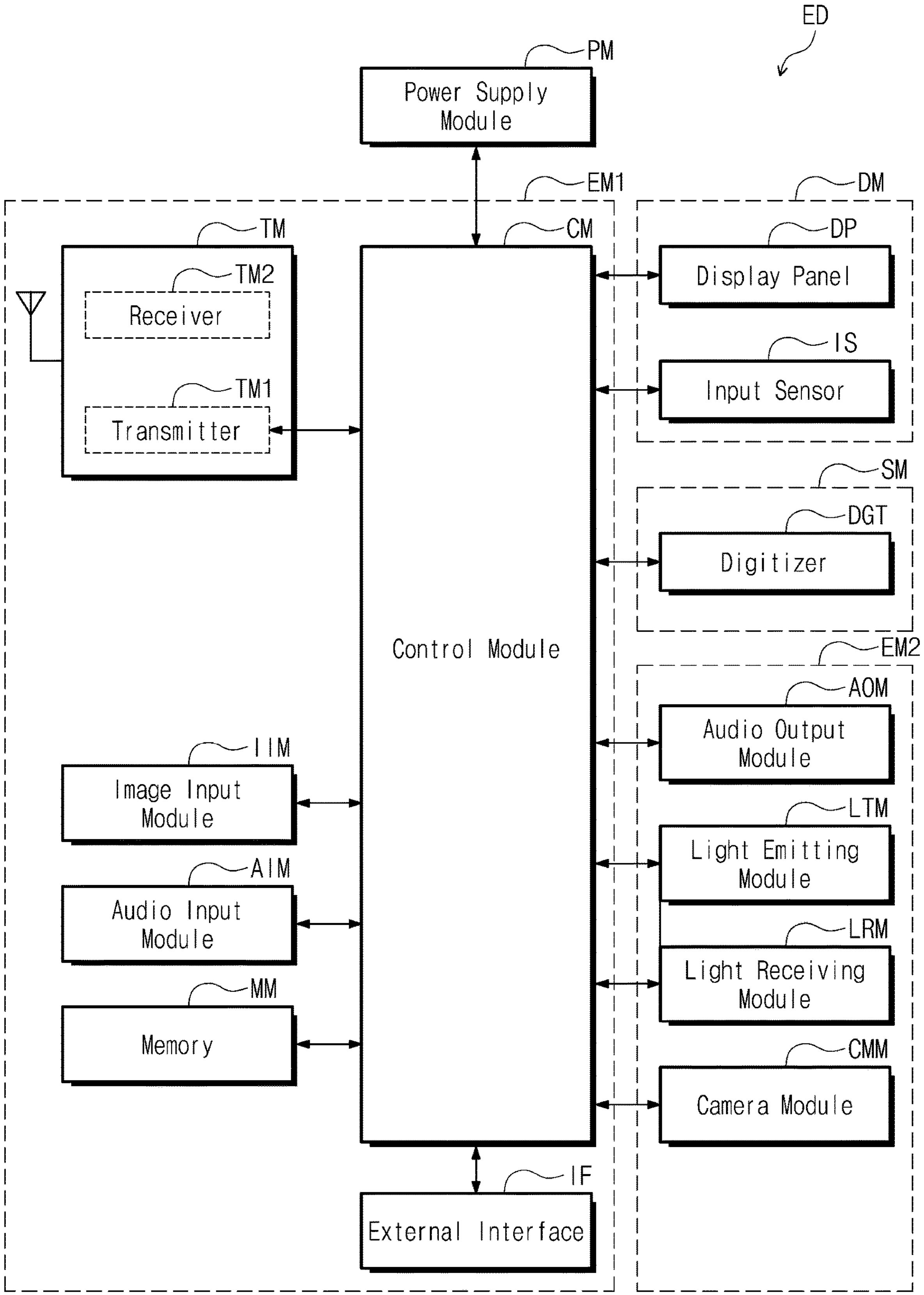
FIG. 3 is a block diagram of an electronic device according to an embodiment of the present disclosure.

FIG. 2 is an exploded perspective view of the electronic device ED according to an embodiment of the present disclosure. FIG. 3 is a block diagram of the electronic device ED according to an embodiment of the present disclosure.

Referring to FIG. 2, the electronic device ED may include a display device DD, a digitizer DGT, a first electronic module EM1, a second electronic module EM2, a power supply module PM, and cases EDC1 and EDC2. Although not shown in figures, the electronic device ED may further include a mechanical structure (e.g., a hinge structure) to control a folding operation of the display device DD.

The display device DD may generate the image IM and/or may sense the external input. The display device DD may include a window module WM and a display module DM.

The window module WM may provide or define the front surface of the electronic device ED. A front surface of the window module WM may correspond to the front surface of the electronic device ED. The window module WM may transmit a light generated by the display module DM to provide the light to outside the electronic device ED. The window module WM may be disposed on the display module DM and may have a shape (e.g., a planar shape) corresponding to that of the display module DM. The window module WM may entirely cover a front surface of the display module DM (e.g., cover an entirety of the front surface) and may protect the display module DM from external scratches and external impacts.

Referring to FIGS. 2 and 3, the display module DM may include a display panel DP, and the display module DM may further include a plurality of components disposed above and under the display panel DP. According to an embodiment, the display module DM may further include an input sensor IS. The input sensor IS may be stacked above or under the display panel DP and may form an electronic panel EP (refer to FIG. 4) described later. A stack structure of the display module DM will be described in detail later.

The display panel DP may display the image IM in response to electrical signals. According to an embodiment, the display panel DP may be a light emitting type display panel, however, should not be limited thereto or thereby. As an example, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot or a quantum rod. Hereinafter, the organic light emitting display panel will be described as a representative example of the display panel DP.

The input sensor IS may sense an external input applied thereto from the outside and may obtain coordinate information about the external input. The input sensor IS may operate in various manners, such as a capacitive manner, a resistive manner, an infrared manner, or a pressure manner, and should not be particularly limited.

Referring to FIG. 2, the display module DM may include a display area DP-DA through which the image IM provided from the display panel DP is displayed, and a non-display area DP-NDA in which no image IM is displayed. The display area DP-DA of the display module DM may correspond to the display area F-AA (refer to FIG. 1A) of the electronic device ED, and the non-display area DP-NDA of the display module DM may correspond to the peripheral area F-NAA (refer to FIG. 1A) of the electronic device ED. In the present disclosure, the expression "an area or a portion corresponds to another area or portion" means that "an area or portion overlaps another area or portion", however, the "areas and portions" should not be limited to having the same size as each other. Various components or layers of the electronic device ED may include a folding area FA, a non-folding area, a display area DP-DA (or a display area F-AA), a non-display area DP-NDA or a peripheral area F-NAA corresponding to those described above. Various components or layers of the electronic device ED may be foldable together with each other at the folding area FA.

The display area DP-DA of the display module DM may include a first area A1 and a second area A2. The second area A2 may surround the first area A1, however, should not be limited thereto or thereby. According to an embodiment, the second area A2 may surround only a portion of the first area A1. In the present embodiment, the first area A1 is shown as a circular shape as a planar shape, however, the shape of the first area A1 should not be limited thereto or thereby. The first area A1 may have a variety of planar shapes, such as an oval shape, a polygonal shape, or an irregular shape. The first area A1 may be referred to as a component area, and the second area A2 may be referred to as a main display area.

The first area A1 may correspond to the signal transmission area TA (refer to FIG. 1A) of the electronic device ED. The first area A1 may overlap a camera module CMM disposed under the display module DM. The first area A1 may have a transmittance higher than that of the second area A2. In addition, the first area A1 may have a resolution lower than that of the second area A2. Accordingly, a light traveling through the first area A1 may be transmitted to the camera module CMM, or a signal output from the camera module CMM may pass through the first area A1.

The display module DM may include a data driver DIC disposed in the non-display area DP-NDA. The data driver DIC may further include a data driving circuit to drive elements. The data driver DIC may be mounted in the non-display area DP-NDA of the display module DM, such as after being manufactured in the form of an integrated circuit chip. The display module DM may further include a circuit board FCB connected to the display module DM at the non-display area DP-NDA. According to an embodiment, the data driver DIC may be mounted on the circuit board FCB.

A sensing module SM may include the digitizer DGT. The digitizer DGT may be disposed under the display module DM. The digitizer DGT may sense an external input different from the external input sensed by the input sensor IS included in the display module DM. As an example, the input sensor IS may sense the touch input generated by an input tool such as a body part of a user, and the digitizer DGT may sense the touch input generated by the pen PN (refer to FIG. 1A), however, should not be limited thereto or thereby.

The digitizer DGT may be provided with (or define) a through hole defined therethrough and overlapping the camera module CMM when viewed in the plane. The through hole may be defined through components of the digitizer DGT in an area corresponding to the signal transmission area TA (refer to FIG. 1A) of the electronic device ED and the first area A1 of the display module DM. At least a portion of the camera module CMM may be inserted into or extended into the through hole, however, should not be limited thereto or thereby. According to an embodiment, the through hole may not be defined through the digitizer DGT depending on a location of the camera module CMM.

An opening OP provided in plural including a plurality of openings OP may be defined through the digitizer DGT to overlap the folding area FA. Each of the openings OP may be defined through the digitizer DGT, such as extending through a thickness of the digitizer DGT. A flexibility of the digitizer DGT at the folding area FA may be improved due to the openings OP in folding of the electronic device ED.

The digitizer DGT may include a first sensing portion SA1 corresponding to the first non-folding area NFA1 and a second sensing portion SA2 corresponding to the second non-folding area NFA2. The first sensing portion SA1 and the second sensing portion SA2 may be distinguished from each other according to the area of the digitizer DGT which senses the external input. An area where the external input is sensed by the first sensing portion SA1 may be defined as a first sensing area, and an area where the external input sensed by the second sensing portion SA2 may be defined as a second sensing area. According to an embodiment, the first sensing portion SA1 and the second sensing portion SA2 may be distinguished from each other with the openings OP interposed therebetween in the second direction DR2.

The digitizer DGT may include a plurality of coils (e.g., a conductive coil pattern provided in plural including a plurality of conductive coil patterns) disposed in each of the first and second sensing portions SA1 and SA2 and may sense the external inputs by the electromagnetic resonance (EMR) method. According to the EMR method, a resonant circuit provided in the pen PN (refer to FIG. 1A) may generate a magnetic field, the vibrating magnetic field may induce signals to the coils included in the digitizer DGT, and a position of the pen PN (refer to FIG. 1A) may be detected based on the signals induced to the coils. The digitizer DGT will be described in detail later.

Referring to FIGS. 2 and 3, the power supply module PM, the first electronic module EM1, and the second electronic module EM2 may be disposed under the display module DM. The power supply module PM, the first electronic module EM1, and the second electronic module EM2 may be disposed under the digitizer DGT. The power supply module PM and the first and second electronic modules EM1 and EM2 may be connected to each other via a separate flexible circuit board (not shown). The power supply module PM may supply a power source necessary for an overall operation of the electronic device ED. The power supply module PM may include a battery module.

The first electronic module EM1 and the second electronic module EM2 may include a variety of functional modules to drive the electronic device ED. Each of the first electronic module EM1 and the second electronic module EM2 may be mounted directly on a mother board (not shown), which is electrically connected to the display panel DP, or may be electrically connected to the mother board via a connector after being mounted on a separate substrate.

The first electronic module EM1 may include a control module CM (e.g., controller), a wireless communication module TM, an image input module IIM, an audio input module AIM, a memory MM, and an external interface IF.

The control module CM may control an overall operation of the electronic device ED. The control module CM may include at least one microprocessor. For example, the control module CM may activate or deactivate the display module DM in response to an external input. In addition, the control module CM may control other modules, such as the sensing module SM, the image input module IIM, or the audio input module AIM, based on the external input.

The wireless communication module TM may communicate with an external electronic device through a first network, for example, a short-range communication network such as Bluetooth, WiFi direct, or infrared data association (IrDA), or a second network, for example, a long-range communication network such as a cellular network, an internet, or a computer network (e.g., LAN or WAN). Communication modules included in the wireless communication module TM may be integrated into one component, for example, a single chip, or may be implemented as a plurality of components separated from each other, for example, a plurality of chips. The wireless communication module TM may transmit/receive a voice signal using a general communication line. The wireless communication module TM may include a transmitter TM1 that modulates a signal to be transmitted and transmits the modulated signal and a receiver TM2 that demodulates a signal applied thereto.

The image input module IIM may process an image signal and may convert the image signal into image data that may be displayed through the display panel DP. The audio input module AIM may receive an external sound signal through a microphone in a record mode or a voice recognition mode and may convert the external sound signal to electrical voice data.

The external interface IF may include a connector that physically connects the electronic device ED to an external electronic device which is outside the electronic device ED. For example, the external interface IF may serve as an interface between the control module CM and external devices, such as an external charger, a wired/wireless data port, a card socket (e.g., a memory card and a SIM/UIM card), etc.

The second electronic module EM2 may include an audio output module AOM, a light emitting module LTM, a light receiving module LRM, and the camera module CMM.

The audio output module AOM may convert audio data provided from the wireless communication module TM or audio data stored in the memory MM and may output the converted audio data to the outside.

The light emitting module LTM may generate and emit a light. The light emitting module LTM may emit an infrared light. The light emitting module LTM may include a light emitting diode (LED) element. The light receiving module LRM may sense the infrared light. The light receiving module LRM may be activated when the infrared light above a predetermined level is sensed. The light receiving module LRM may include a CMOS sensor. The infrared light generated and emitted from the light emitting module LTM may be reflected by an external object (e.g., a body part such as a user's finger or face), and the reflected infrared light may be incident into the light receiving module LRM.

The camera module CMM may take a photo or a video. The camera module CMM may be provided in plural. The camera module CMM may overlap (or correspond to) the first area A1 and may receive an optical signal through the first area A1. As an example, the camera module CMM may receive a natural light through the first area A1 from the outside to take a picture of an external object.

The window module WM may be coupled to the cases EDC1 and EDC2 to form an external appearance of the electronic device ED and may provide an inner space in which the components of the electronic device ED are accommodated. As an example, the cases EDC1 and EDC2 may accommodate the display module DM, the first and second electronic modules EM1 and EM2, and the power supply module PM. The cases EDC1 and EDC2 may protect the components accommodated therein, e.g., the display module DM, the first and second electronic modules EM1 and EM2, and the power supply module PM. Although not shown in figures, the electronic device ED may further include the hinge structure to connect the cases EDC1 and EDC2.

Figure 4:
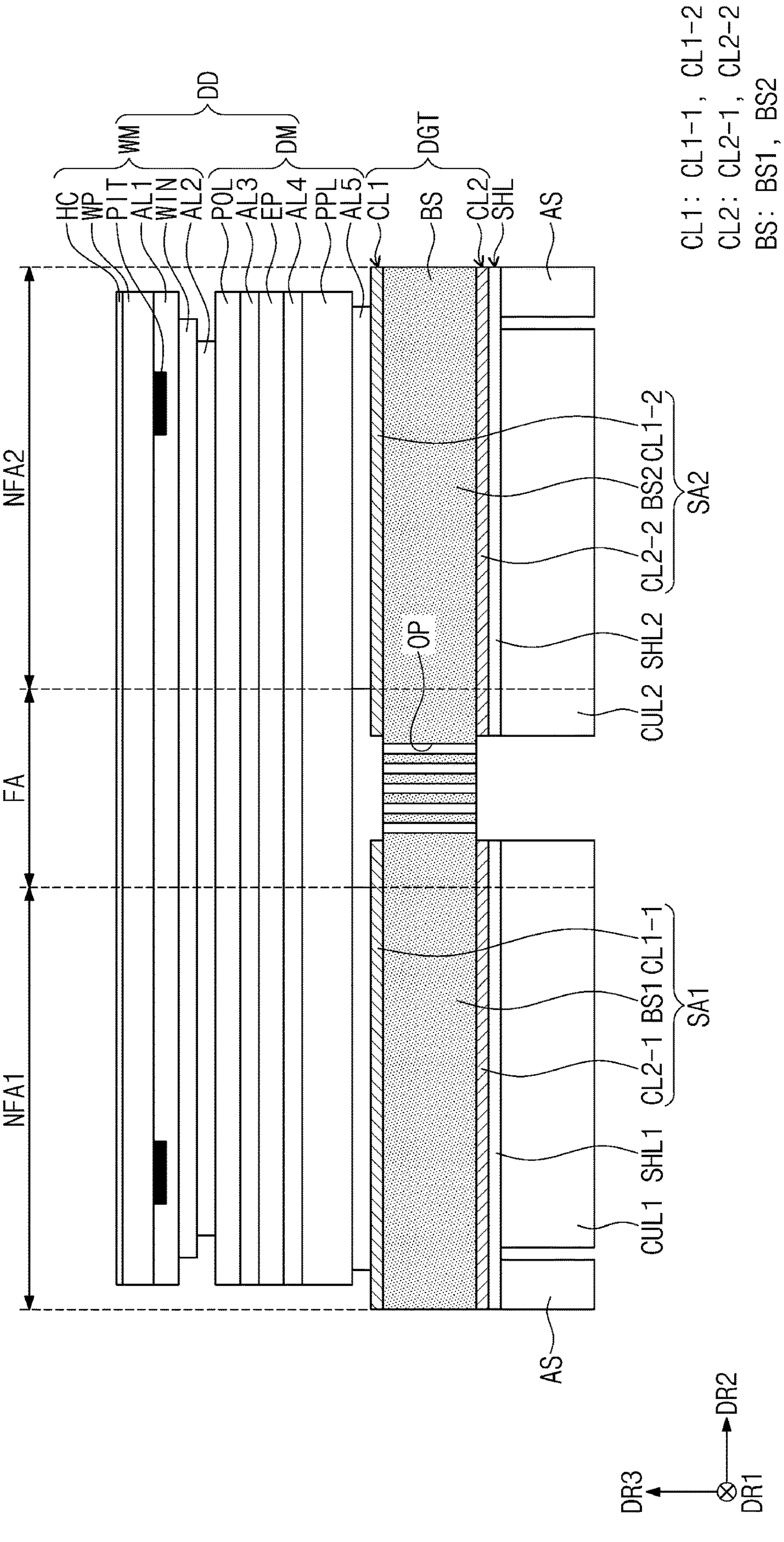
FIG. 4 is a cross-sectional view of an electronic device according to an embodiment of the present disclosure.

FIG. 4 is a cross-sectional view of the electronic device ED according to an embodiment of the present disclosure. FIG. 4 shows a stack structure of the display device DD and the digitizer DGT among the components of the electronic device ED shown in FIG. 2, and the electronic modules EM1 and EM2, the power supply module PM, and the cases EDC1 and EDC2 are omitted in FIG. 4.

Referring to FIG. 4, the display device DD may include the display module DM and the window module WM which is disposed on the display module DM. The window module WM and the display module DM may have a flexibility. The window module WM and the display module DM may include the first non-folding area NFA1, the folding area FA, and the second non-folding area NFA2. As the folding area FA is folded with respect to the folding axis, the window module WM and the display module DM may be foldable together with each other.

The window module WM may include a window WIN, a window protective layer WP, a hard coating layer HC, a bezel pattern PIT, and first and second adhesive layers AL1 and AL2.

The window WIN may be disposed on the display module DM. The window WIN may protect the display panel DP and the input sensor IS, which constitute the electronic panel EP, from external scratches.

The window WIN may include an optically transparent material. The window WIN may include a glass material. In detail, the window WIN may include a tempered glass, however, should not be limited thereto or thereby. According to an embodiment, the window WIN may include a synthetic resin film.

The window WIN may have a single-layer or multi-layer structure. As an example, the window WIN may include a plurality of synthetic resin films attached to each other by an adhesive or a glass substrate and a synthetic resin film attached to the glass substrate by an adhesive.

The window protective layer WP may be disposed on the window WIN. The window protective layer WP may include an organic material. As an example, the window protective layer WP may include at least one of polyimide, polycarbonate, polyamide, triacetylcellulose, polymethylmethacrylate, and polyethylene terephthalate. However, a material for the window protective layer WP should not be limited thereto or thereby.

The hard coating layer HC may be disposed on the window protective layer WP. The hard coating layer HC may complement a rigidity of the window module WM and may provide a flat upper surface. The hard coating layer HC may include at least one functional layer. As an example, the functional layer may be an anti-fingerprint layer or an anti-reflective layer.

The bezel pattern PIT may be disposed on a lower surface of the window protective layer WP, however, should not be limited thereto or thereby. The bezel pattern PIT may be disposed on an upper surface or a lower surface of the window WIN. The bezel pattern PIT may be formed by a coating or printing method. An area in which the bezel pattern PIT is disposed may correspond to a planar area of the peripheral area F-NAA (refer to FIG. 1A) of the electronic device ED. The bezel pattern PIT may include a colored light blocking layer. The bezel pattern PIT may prevent components of the electronic panel EP, which are disposed to overlap the bezel pattern PIT, from being viewed from the outside.

The first adhesive layer AL1 may be disposed between the window protective layer WP and the window WIN. The window protective layer WP may be attached to the window WIN by the first adhesive layer AL1. The first adhesive layer AL1 may cover the bezel pattern PIT. The second adhesive layer AL2 may be disposed on the lower surface of the window WIN, and the window WIN may be attached to the display module DM by the second adhesive layer AL2.

The display module DM may include the electronic panel EP, an optical film layer POL, a panel protective layer PPL, and third, fourth, and fifth adhesive layers AL3, AL4, and AL5. The electronic panel EP may include the display panel DP (refer to FIG. 3) and the input sensor IS (refer to FIG. 3), and this will be described in detail later with reference to FIG. 5B.

The optical film layer POL may be disposed on the electronic panel EP. The optical film layer POL may include a polarizing film to reduce a reflectance with respect to an external light incident to the electronic panel EP. The polarizing film may include a retarder and/or a polarizer. The optical film layer POL may include a protective film that absorbs the external impact applied to the electronic panel EP from the above of the electronic device ED and protects the electronic panel EP. According to an embodiment, the optical film layer POL may include one of the polarizing film and the protective film or may include the polarizing film and the protective film, which are sequentially stacked.

The optical film layer POL may be coupled to the electronic panel EP by the third adhesive layer AL3 disposed between the electronic panel EP and the optical film layer POL, however, should not be limited thereto or thereby. According to an embodiment, the optical film layer POL may be disposed directly on the electronic panel EP or may be omitted.

The panel protective layer PPL may be disposed under the electronic panel EP. The panel protective layer PPL may be coupled to a rear surface of the electronic panel EP by the fourth adhesive layer AL4 disposed between the panel protective layer PPL and the electronic panel EP. The panel protective layer PPL may protect a lower portion of the electronic panel EP. The panel protective layer PPL may prevent scratches from occurring on the rear surface of the electronic panel EP, such as in the manufacturing process of the electronic panel EP.

The panel protective layer PPL may include a synthetic resin film. As an example, the panel protective layer PPL may include at least one of polyamide and polyethylene terephthalate. However, a material for the panel protective layer PPL should not be limited thereto or thereby.

The fifth adhesive layer AL5 may be disposed between the panel protective layer PPL and the digitizer DGT, and the panel protective layer PPL may be coupled to the digitizer DGT by the fifth adhesive layer AL5. The fifth adhesive layer AL5 may overlap the first and second non-folding areas NFA1 and NFA2 and may not overlap the folding area FA. That is, the fifth adhesive layer AL5 may not be disposed in the folding area FA, and thus, the flexibility of the digitizer DGT disposed under the display module DM may be improved. As not overlapping, elements may be adjacent to each other or spaced apart from each other along a plane, such as being coplanar with each other.

Each of the first to fifth adhesive layers AL1 to AL5 may include a transparent adhesive such as a pressure sensitive adhesive (PSA) or an optically clear adhesive (OCA), however, the adhesive should not be particularly limited.

The digitizer DGT may be disposed under the display module DM. The digitizer DGT may include a substrate BS, a first conductive layer CL1, and a second conductive layer CL2.

The substrate BS may provide a base surface on which the first conductive layer CL1 and the second conductive layer CL2 of the digitizer DGT are formed. The substrate BS may serve as a main body of the digitizer DGT and may allow the digitizer DGT to have a predetermined rigidity. The substrate BS may be provided as an integral substrate overlapping the first non-folding area NFA1, the second non-folding area NFA2, and the folding area FA.

The substrate BS may be provided with a plurality of openings OP defined therethrough and overlapping the folding area FA. The openings OP may be formed through the substrate BS along the third direction DR3 in an area overlapping the folding area FA. The flexibility of the substrate BS may be improved by the openings OP in the area overlapping the folding area FA. This will be described in detail with reference to FIGS. 6A and 6B.

The substrate BS may include a material having a predetermined rigidity. The substrate BS may include a material having a relatively large resistance to a compressive force caused by an external pressure. As an example, the substrate BS may include a fiber reinforced composite material. The fiber reinforced composite material may include a carbon fiber reinforced plastic (CFRP) or a glass fiber reinforced plastic (GFRP), however, a material for the reinforce fiber should not be limited thereto or thereby.

The substrate BS may have a flexural modulus equal to or greater than about 20 gigapascals (GPa) and equal to or smaller than about 45 GPa. When the flexural modulus of the substrate BS is smaller than about 20 GPa, the substrate BS may be deformed by a folding or compressive force. When the flexural modulus of the substrate BS is greater than about 45 GPa, the flexibility of the substrate BS may decrease, and thus, the substrate BS may not be folded with a desired predetermined curvature or may be damaged when being folded.

The substrate BS may have a modulus relatively greater than a modulus of the display module DM. Accordingly, when the electronic device ED is folded, the display module DM may be foldable together with the digitizer DGT, and a shape of the display module DM may correspond to a shape of the substrate BS. In addition, as the substrate BS includes the fiber reinforced composite material having a relatively large resistance against the compressive force, a step difference between the components of the electronic device ED, which are disposed under the digitizer DGT, in a process of coupling the components of the electronic device ED may be prevented from being viewed from the outside.

A thickness of the substrate BS of the digitizer DGT may be changed in consideration of the design characteristics of the electronic device ED, the mechanical properties of the digitizer DGT, and the stack position of the digitizer DGT. As an example, the thickness of the substrate BS may be within a range from about 100 micrometers (μm) to about 300 μm. When the thickness of the substrate BS is smaller than about 100 μm, the rigidity of the substrate BS may decrease and the substrate BS may be deformed by the folding or compressive force. When the thickness of the substrate BS is greater than about 300 μm, the flexibility of the substrate BS may decrease, and thus, the substrate BS may not be folded with a desired curvature or may be damaged when being folded. In addition, when the thickness of the substrate BS is greater than about 300 μm, the thickness of the electronic device ED may increase.

Since the substrate BS includes the fiber reinforced composite material, the thickness of the substrate BS may be easily controlled. In detail, the thickness of the substrate BS including the fiber reinforced composite material may be easily controlled by adjusting the stack structure of reinforced fibers and a thickness of a matrix portion. As the substrate BS includes the fiber reinforced composite material, the shape of the substrate BS may be relatively easily processed, and the openings OP may be easily formed through the substrate BS.

As the substrate BS includes the fiber reinforced composite material, the substrate BS may be light-weight. The substrate BS may have a light weight and may have a modulus and strength similar to that of a metal plate.

Since the substrate BS includes the fiber reinforced composite material, a heat generated by the first conductive layer CL1 and the second conductive layer CL2 when the digitizer DGT is driven may be easily dissipated. That is, the substrate BS may otherwise function as a heat dissipation layer. Accordingly, damage due to the heat generated by the digitizer DGT, to the digitizer DGT and components which are arranged adjacent to the digitizer DGT may be reduced or effectively prevented.

The substrate BS may have a color absorbing the light. As an example, the substrate BS may have a black color. In this case, viewability to the outside, of components disposed under the digitizer DGT, may be reduced or effectively prevented, however, the present disclosure should not be limited thereto or thereby.

As the digitizer DGT disposed under the display module DM includes the substrate BS having a certain stiffness and rigidity, the display module DM may be supported even though a separate support plate is not disposed between the display module DM and the digitizer DGT. That is, since an additional support plate is omitted, the stacked structure of the electronic device ED may be simplified. As the stacked structure of the electronic device ED is simplified, the thickness and the weight of the electronic device ED may be reduced, and the manufacturing cost of the electronic device ED may be reduced.

The first conductive layer CL1 may be disposed on one surface of the substrate BS (e.g., a first surface, where the first surface is closest to the display module DM). As an example, the first conductive layer CL1 may be disposed on an upper surface of the substrate BS. The second conductive layer CL2 may be disposed on the other surface of the substrate BS, which is opposite to the one surface of the substrate BS. As an example, the second conductive layer CL2 may be disposed on a lower surface of the substrate BS (e.g., a second surface opposite to the first surface, where the second surface is furthest from the display module DM). Each of the first conductive layer CL1 and the second conductive layer CL2 may be in contact with the substrate BS. Each of the first conductive layer CL1 and the second conductive layer CL2 may be disposed directly on the substrate BS and may include conductive patterns provided in the form of coils.

Each of the first conductive layer CL1 and the second conductive layer CL2 may include a conductive material such as a metal material. As an example, each of the first conductive layer CL1 and the second conductive layer CL2 may include gold (Au), silver (Ag), copper (Cu), or aluminum (Al). However, materials for the first conductive layer CL1 and the second conductive layer CL2 should not be limited thereto or thereby.

The digitizer DGT may include the first sensing portion SA1 and the second sensing portion SA2. The digitizer DGT may be driven in the electromagnetic resonance (EMR) method by the substrate BS and the coils disposed on the substrate BS, and the position of the pen PN (refer to FIG. 1A) may be detected based on a variation of the electromagnetic field, which is caused by the approach of the pen PN (refer to FIG. 1A).

The magnetic field generated by the first sensing portion SA1 and the second sensing portion SA2 may be applied to an LC resonant circuit formed (or provided) by an inductor (coil) and a capacitor of the pen PN (refer to FIG. 1A). The coil may generate a current (e.g., an electrical current) in response to the magnetic field applied thereto and may supply the generated current to the capacitor. Accordingly, the capacitor may be charged with the current supplied thereto from the coil and may discharge the charged current to the coil. Consequently, the magnetic field of the resonant frequency may be emitted from the coil. The magnetic field emitted by the pen PN (refer to FIG. 1A) may be absorbed by the coils of the digitizer DGT, and thus, it is possible to determine a position in the first sensing portion SA1 and the second sensing portion SA2 to which the pen PN (refer to FIG. 1A) gets close.

The substrate BS may include a first portion BS1 and a second portion BS2, which are arranged in the second direction DR2. The first portion BS1 and the second portion BS2 of the substrate BS may be disposed spaced apart from each other such that the area in which the openings OP are defined may be disposed therebetween. The first portion BS1 of the substrate BS may be provided as a substrate portion of the first sensing portion SA1, and the second portion BS2 may be provided as a substrate portion of the second sensing portion SA2. Accordingly, the first sensing portion SA1 and the second sensing portion SA2 may be spaced apart from each other in the second direction DR2, and the openings OP may be disposed therebetween.

A size of the planar area in which the openings OP are defined may be substantially the same as or smaller than a size (e.g., planar area) of the folding area FA. Accordingly, a portion of the first portion BS1 of the substrate BS and a portion of the second portion BS2 of the substrate BS may overlap the folding area FA. However, the present disclosure should not be limited thereto or thereby, and the size of the area in which the openings OP are defined may be changed depending on the position and arrangement of the openings OP.

The first conductive layer CL1 as a first conductive pattern layer may include first conductive patterns CL1-1 and CL1-2 spaced apart from each other with the openings OP interposed therebetween. That is, the first conductive patterns CL1-1 and CL1-2 may be disconnected from each other at the folding area FA. The second conductive layer CL2 as a second conductive pattern layer may include second conductive patterns CL2-1 and CL2-2 spaced apart from each other (e.g., disconnected from each other) with the openings OP interposed therebetween. The first conductive patterns CL1-1 and CL1-2 and the second conductive patterns CL2-1 and CL2-2 may be provided in the form of coils.

Among the first conductive patterns CL1-1 and CL1-2, first conductive patterns CL1-1 corresponding to the first non-folding area NFA1 and disposed on the first portion BS1 of the substrate BS may form the first sensing portion SA1. Among the first conductive patterns CL1-1 and CL1-2, first conductive patterns CL1-2 corresponding to the second non-folding area NFA2 and disposed on the second portion BS2 of the substrate BS may form the second sensing portion SA2.

Similarly, among the second conductive patterns CL2-1 and CL2-2, second conductive patterns CL2-1 corresponding to the first non-folding area NFA1 and disposed on the first portion BS1 of the substrate BS may form the first sensing portion SA1. Among the second conductive patterns CL2-1 and CL2-2, second conductive patterns CL2-2 corresponding to the second non-folding area NFA2 and disposed on the second portion BS2 of the substrate BS may form the second sensing portion SA2.

In other words, the first sensing portion SA1 may include the first portion BS1 of the substrate BS, the first conductive patterns CL1-1 overlapping the first non-folding area NFA1 and formed from the first conductive layer CL1, and the second conductive patterns CL2-1 overlapping the first non-folding area NFA1 and formed from the second conductive layer CL2. The second sensing portion SA2 may include the second portion BS2 of the substrate BS, the first conductive patterns CL1-2 overlapping the second non-folding area NFA2 and formed from the first conductive layer CL1, and the second conductive patterns CL2-2 overlapping the second non-folding area NFA2 and formed from the second conductive layer CL2.

The first sensing portion SA1 and the second sensing portion SA2 may be sensing portions individually driven without interfering with each other, however, should not be limited thereto or thereby. According to an embodiment, the first sensing portion SA1 and the second sensing portion SA2 may be electrically connected to each other and may be driven together with each other.

The digitizer DGT may further include a cover layer (not shown) overlapping the openings OP and disposed under the substrate BS. The cover layer may be formed in the form of sheet, may be attached to the substrate BS, and may cover the openings OP. Accordingly, the cover layer may prevent a foreign substance from entering the openings OP from outside the digitizer DGT.

The electronic device ED may further include a shielding layer SHL, cushion layers CUL1 and CUL2, and a step difference compensation portion AS.

The shielding layer SHL may be disposed under the digitizer DGT. The shielding layer SHL may include a first shielding layer SHL1 and a second shielding layer SHL2, which are respectively coupled to the first sensing portion SA1 and the second sensing portion SA2. The shielding layer SHL may prevent an electromagnetic wave generated by the electronic modules EM1 and EM2 (refer to FIG. 2) from exerting influence on the digitizer DGT. The shielding layer SHL may include a metal material such as copper. According to an embodiment, the shielding layer SHL may include a magnetic metal powder (MMP) layer. The magnetic metal powder layer of the shielding layer SHL may be directly formed on the lower surface of the digitizer DGT through coating and curing processes. However, the material and the forming process of the shielding layer SHL should not be limited thereto or thereby.

The cushion layers CUL1 and CUL2 may include a first cushion layer CUL1 disposed under the first shielding layer SHL1 and a second cushion layer CUL2 disposed under the second shielding layer SHL2. The first cushion layer CUL1 and the second cushion layer CUL2 may absorb the external impacts and may protect the display module DM and the digitizer DGT. The first cushion layer CUL1 and the second cushion layer CUL2 may include a foam sheet with a predetermined elasticity. According to an embodiment, each of the first cushion layer CUL1 and the second cushion layer CUL2 may include sponge or polyurethane. The cushion layers CUL1 and CUL2 may form a step at an end of the electronic device ED, together with one or more layers at the end.

The step difference compensation portion AS may be disposed under the shielding layer SHL. The step difference compensation portion AS may be disposed outside the first and second cushion layers CUL1 and CUL2. The step difference compensation portion AS may be provided in the form of double-sided tape or insulating film. According to an embodiment, the step difference compensation portion AS may include a waterproof tape. The step difference compensation portion AS may be attached to a set bracket of the electronic device ED.

However, the stack structure of the electronic device ED shown in FIG. 4 is merely an example. According to an embodiment, the stacking order of some components of the electronic device ED may be changed, or some components of the electronic device ED may be omitted. According to an embodiment, additional components may be further provided to the electronic device ED.

Figure 5A:
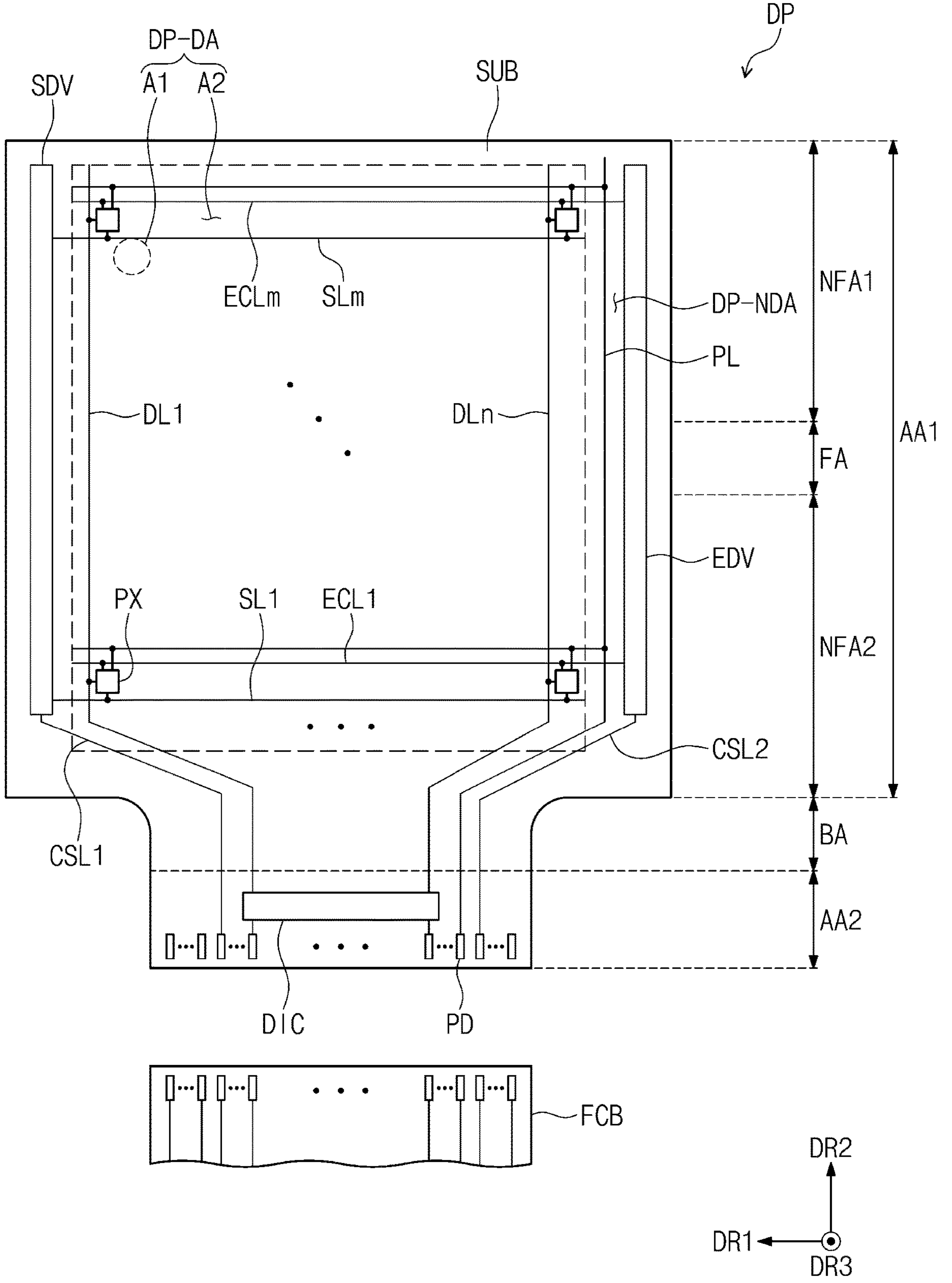
FIG. 5A is a plan view of a display panel according to an embodiment of the present disclosure.

FIG. 5A is a plan view of the display panel DP according to an embodiment of the present disclosure. Referring to FIG. 5A, the display panel DP may include a base substrate SUB, a plurality of pixels PX, a plurality of signal lines electrically connected to the pixels PX, a scan driver SDV, the data driver DIC, an emission driver EDV, and a plurality of pads PD.

The signal lines may include a plurality of scan lines SL1 to SLm, a plurality of data lines DL1 to DLn, a plurality of emission lines ECL1 to ECLm, first and second control lines CSL1 and CSL2, and a power line PL. Each of 'm' and 'n' is a natural number.

The base substrate SUB may include the display area DP-DA and the non-display area DP-NDA. The base substrate SUB may provide a base surface on which electrical elements and lines and other layers of the display panel DP are disposed. The display area DP-DA may be an area in which the image IM is displayed by the pixels PX, and the non-display area DP-NDA may be an area in which drivers are disposed to drive the pixels PX. The non-display area DP-NDA may be disposed adjacent to the display area DP-DA.

The base substrate SUB may have a flexibility. The base substrate SUB may include a first panel area AA1, a second panel area AA2, and a bending area BA. The bending area BA may be disposed between the first panel area AA1 and the second panel area AA2, and the second panel area AA2, the bending area BA and the first panel area AA1 may be arranged in order the second direction DR2. However, the shape of the base substrate SUB in the plane should not be limited thereto or thereby and may be changed in various ways according to a structure of the electronic device ED.

The first panel area AA1 may include the display area DP-DA. An area of the first panel area AA1 except the display area DP-DA, the bending area BA, and the second panel area AA2 may correspond to the non-display area DP-NDA.

The first panel area AA1 may include the first non-folding area NFA1, the second non-folding area NFA2, and the folding area FA. Accordingly, the first panel area AA1 of the display panel DP may be folded (e.g., foldable) with respect to the folding axis as the electronic device ED is folded.

The bending area BA may be bent at a predetermined curvature when the display panel DP is accommodated in the cases EDC1 and EDC2 (refer to FIG. 2). That is, the display panel DP which is bent may define a curvature at the bending area BA. The bending area BA may be bent with respect to an imaginary bending axis substantially parallel to the first direction DR1 such that the second panel area AA2 may overlap the first panel area AA1 when viewed in the plane (e.g., along the thickness direction). A width of the bending area BA in the first direction DR1 may be smaller than a width of the first panel area AA1 in the first direction DR1, and thus, the bending area BA may be easily bent.

Each of the pixels PX may include a pixel driving circuit configured to include a light emitting element, a plurality of transistors (e.g., a switching transistor, a driving transistor, etc.) which are connected to the light emitting element, and a capacitor. Each of the pixels PX may emit a light in response to an electrical signal applied thereto. The pixels PX may be arranged in the display area DP-DA, however, this is merely an example. According to an embodiment, some pixels among the pixels PX may include transistors disposed in the non-display area NDA.

The display area DP-DA may include the first area A1 and the second area A2. The pixels PX may be disposed in the first area A1 and the second area A2. The pixels PX arranged in the first area A1 may have different arrangement, density, and size from those of the pixels PX arranged in the second area A2. Accordingly, the first area A1 may have a light transmittance greater than that of the second area A2, and the optical signal may be easily transmitted to and received from the electronic (or functional) module (e.g., the camera module CMM of FIG. 2), disposed to overlap the first area A1 while the image IM is being displayed in the first area A1.

Each of the scan driver SDV, the data driver DIC, and the emission driver EDV may be disposed in the non-display area DP-NDA. According to an embodiment, the scan driver SDV and the emission driver EDV may be disposed in the first panel area AA1, and the data driver DIC may be disposed in the second panel area AA2. However, they should not be limited thereto or thereby. According to an embodiment, at least one of the scan driver SDV, the data driver DIC, and the emission driver EDV may be disposed to overlap the display area DP-DA. Therefore, a size of the non-display area DP-NDA of the display panel DP may be reduced, and a bezel area of the electronic device may be reduced.

Each of the pixels PX may be connected to a corresponding scan line among the scan lines SL1 to SLm, a corresponding data line among the data lines DL1 to DLn, and a corresponding emission line among the emission lines ECL1 to ECLm. Various types of signal lines may be provided in the display panel DP depending on the configuration of the pixel driving circuit of the pixels PX.

The scan lines SL1 to SLm may extend in the first direction DR1 and may be connected to the scan driver SDV. The data lines DL1 to DLn may extend in the second direction DR2 and may be connected to the data driver DIC. The emission lines ECL1 to ECLm may extend in the first direction DR1 and may be connected to the emission driver EDV.

The power line PL may include a portion extending in the first direction DR1 and a portion extending in the second direction DR2. The portion of the power line PL extending in the first direction DR1 and the portion of the power line PL extending in the second direction DR2 may be disposed on different layers from each other, however, should not be limited thereto or thereby. As being on a same layer, elements may be formed (or provided) in a same process and/or include a same material, elements may be in a same layer as each other as respective portions of a same material layer, elements may be on a same layer by forming an interface with a same underlying or overlying layer, etc., without being limited thereto.

According to an embodiment, the portion of the power line PL extending in the first direction DR1 and the portion of the power line PL extending in the second direction DR2 may be disposed on the same layer and may be provided integrally with each other. The portion of the power line PL extending in the second direction DR2 may extend to the second panel area AA2 via the bending area BA. The power line PL may receive a driving voltage and may apply the driving voltage to the pixels PX.

The first control line CSL1 may be connected to the scan driver SDV and may extend to a lower end of the second panel area AA2 via the bending area BA. The second control line CSL2 may be connected to the emission driver EDV and may extend to the lower end of the second panel area AA2 via the bending area BA.

The pads PD may be disposed adjacent to the lower end of the second panel area AA2. The pads PD may be disposed closer to the lower end of the display panel DP than the data driver DIC. The pads PD may be arranged in the first direction DR1. The pads PD may be connected to the circuit board FCB. The circuit board FCB may include a timing controller to control an operation of the scan driver SDV, the data driver DIC, and the emission driver EDV and a voltage generator to generate a voltage, and the circuit board FCB may be electrically connected to the display panel DP via (or at) the pads PD.

Each of the pads PD may be connected to a corresponding signal line among the signal lines. The power line PL and the first and second control lines CSL1 and CSL2 may be connected to the pads PD. The data lines DL1 to DLn may be electrically connected to corresponding pads PD via the data driver DIC.

The scan driver SDV may generate a plurality of scan signals in response to a scan control signal. The scan signals may be applied to the pixels PX via the scan lines SL1 to SLm. The data driver DIC may generate a plurality of data voltages corresponding to image signals in response to a data control signal. The data voltages may be applied to the pixels PX via the data lines DL1 to DLn. The emission driver EDV may generate a plurality of emission signals in response to an emission control signal. The emission signals may be applied to the pixels PX via the emission lines ECL1 to ECLm.

The pixels PX may receive the data voltages in response to the scan signals. The pixels PX may emit a light having a luminance corresponding to the data voltages in response to the emission signals, and thus, the image IM may be displayed. An emission time of the pixels PX may be controlled by the emission signals. Accordingly, the display panel DP may display the image IM through the display area DP-DA using the pixels PX.

Figure 5B:
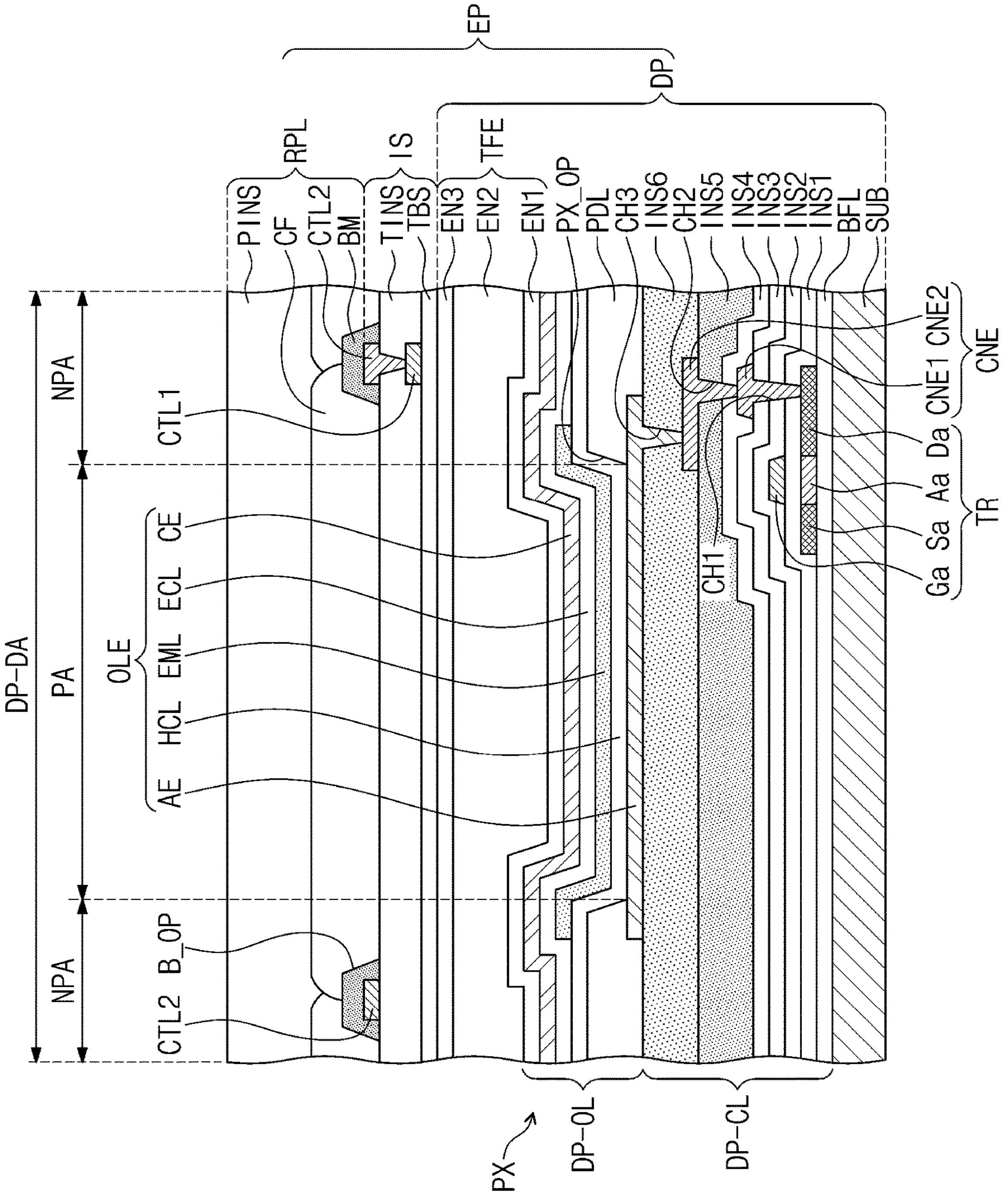
FIG. 5B is a cross-sectional view of an electronic panel according to an embodiment of the present disclosure.

FIG. 5B is a cross-sectional view of the electronic panel EP according to an embodiment of the present disclosure. Referring to FIG. 5B, the electronic panel EP may include the display panel DP, the input sensor IS, and the anti-reflective layer RPL. FIG. 5B shows a cross-section of the electronic panel EP corresponding to one pixel PX as a representative example.

Referring to FIG. 5B, the display panel DP may include the pixel PX, and the pixel PX may include the transistor TR and the light emitting element OLE, which are disposed on the base substrate SUB. The pixel PX may include a plurality of transistors and a capacitor to drive the light emitting element OLE, however, FIG. 5B shows one transistor TR when viewed in the cross-section.

The display area DP-DA may include a light emitting area PA corresponding to the pixel PX and a non-light-emitting area NPA which is adjacent to the light emitting area PA. The display panel DP may include plural pixels PX, and thus, the light emitting area PA may be provided in plural. The light emitting areas PA may be defined in the display area DP-DA and may correspond to the pixels PX. The non-light-emitting area NPA may surround the light emitting areas PA.

The display panel DP may include the base substrate SUB, a circuit layer DP-CL, a display element layer DP-OL, and an encapsulation layer TFE.

The base substrate SUB may include a glass substrate, a metal substrate, a polymer substrate, or an organic/inorganic composite material substrate. According to an embodiment, the base substrate SUB may include a synthetic resin layer with a flexibility. As an example, the synthetic resin layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, a perylene-based resin, and a polyimide-based resin. However, a material for the base substrate SUB should not be limited thereto or thereby.

The circuit layer DP-CL may be disposed on the base substrate SUB. The circuit layer DP-CL may include at least one insulating layer, a conductive pattern, and a semiconductor pattern. An insulating layer, a semiconductor layer, and a conductive layer may be formed on the base substrate SUB by a coating or depositing process during a manufacturing process of the display panel DP. Then, the insulating layer, the semiconductor layer, and the conductive layer may be selectively patterned through several photolithography processes. After the processes are completed, the semiconductor pattern and the conductive pattern in the circuit layer DP-CL may be formed.

FIG. 5B shows a buffer layer BFL, first, second, third, fourth, fifth, and sixth insulating layers INS1, INS2, INS3, INS4, INS5, and INS6, and a semiconductor pattern and conductive patterns, which are disposed between the buffer layer BFL and the first to sixth insulating layers INS1 to INS6. However, the cross-section of the circuit layer DP-CL shown in FIG. 5B is merely an example, and the stack structure of the circuit layer DP-CL may be changed in various ways depending on the order of processes, the process method, or the configuration of the elements included in the pixel PX.

The buffer layer BFL may be disposed on the base substrate SUB. The buffer layer BFL may prevent a foreign substance from entering the transistor TR from the outside. The buffer layer BFL may increase an adhesion between the base substrate SUB and the semiconductor pattern or between the base substrate SUB and the conductive pattern. The buffer layer BFL may include an inorganic layer. As an example, the buffer layer BFL may include at least one of a silicon oxide layer and a silicon nitride layer. According to an embodiment, the buffer layer BFL may include silicon oxide layers alternately stacked with silicon nitride layers.

The semiconductor pattern of the transistor TR may be disposed on the buffer layer BFL. A source Sa, a channel Aa (or an active region), and a drain Da of the transistor TR may be formed from the semiconductor pattern. The semiconductor pattern of the transistor TR may include a silicon semiconductor and may include a crystalline silicon semiconductor, a polysilicon semiconductor, or an amorphous silicon semiconductor, however, should not be limited thereto or thereby. The semiconductor pattern of the transistor TR may include an oxide semiconductor such as a transparent conductive oxide (TCO), e.g., indium tin oxide (ITO), indium zinc oxide (IZO), indium gallium zinc oxide (IGZO), zinc oxide (ZnO), or indium oxide (In2O3). The semiconductor pattern of the transistor TR may include a variety of materials as long as the semiconductor pattern has a semiconductor property, and should not be particularly limited.

The semiconductor pattern of the transistor TR may include a plurality of areas distinguished from each other depending on conductivity. As an example, regions of the semiconductor pattern may have different electrical properties depending on whether the region is doped or not or whether a transparent conductive oxide is reduced or not. An area (or region) of the semiconductor pattern, which has a relatively large conductivity, may substantially act as an electrode or a signal line and may correspond to the source Sa and the drain Da of the transistor TR. An area of the semiconductor pattern, which is not doped or not reduced and has a relatively small conductivity, may substantially correspond to the channel Aa of the transistor TR.

The first to sixth insulating layers INS1 to INS6 may be stacked on the semiconductor pattern. The first to sixth insulating layers INS1 to INS6 may include an inorganic layer or an organic layer. As an example, the inorganic layer may include at least one of aluminum oxide, titanium oxide, silicon oxide, silicon nitride, silicon oxynitride, zirconium oxide, and hafnium oxide. The organic layer may include a phenolic-based polymer, an acrylic-based polymer, an imide-based polymer, an aryl ether-based polymer, an amide-based polymer, a fluorine-based polymer, a p-xylene-based polymer, a vinyl alcohol-based polymer, or blends thereof. However, the material for the insulating layer should not be limited thereto or thereby.

The first insulating layer INS1 may be disposed on the buffer layer BFL and may cover the semiconductor pattern of the transistor TR. The first insulating layer INS1 may be disposed between the channel Aa of the transistor TR and a gate Ga of the transistor TR.

The gate Ga may be disposed on the first insulating layer INS1. The gate Ga may be a portion of the conductive pattern of the circuit layer DP-CL. When viewed in a plane, the gate Ga may overlap the channel Aa of the transistor TR. The gate Ga may serve as a mask in a process of doping the semiconductor pattern.

The transistor TR of FIG. 5B is merely an example, and the source Sa or the drain Da may be an electrode independently formed from the semiconductor pattern. In this case, the source Sa and the drain Da may be in contact with the semiconductor pattern or may be connected to the semiconductor pattern after penetrating through the insulating layer. According to an embodiment, the gate Ga may be disposed under the semiconductor pattern. The transistor TR may have various structures and should not be particularly limited.

The second insulating layer INS2 may be disposed on the first insulating layer INS1 and may cover the gate Ga. The third insulating layer INS3 may be disposed on the second insulating layer INS2. According to an embodiment, each of the first to third insulating layers INS1 to INS3 may be an inorganic layer having a single-layer or multiple-layer structure.

A connection electrode CNE may include a first connection electrode CNE1 and a second connection electrode CNE2 to connect the transistor TR and the light emitting element OLE. The first connection electrode CNE1 may be disposed on the third insulating layer INS3 and may be connected to the drain Da via a first contact hole CH1 defined through the first to third insulating layers INS1 to INS3. The fourth insulating layer INS4 may be disposed on the first connection electrode CNE1.

The fifth insulating layer INS5 may be disposed on the fourth insulating layer INS4. The second connection electrode CNE2 may be disposed on the fifth insulating layer INS5. The second connection electrode CNE2 may be connected to the first connection electrode CNE1 via a second contact hole CH2 defined through the fourth and fifth insulating layers INS4 and INS5. The sixth insulating layer INS6 may be disposed on the fifth insulating layer INS5 and may cover the second connection electrode CNE2.

At least one of the first connection electrode CNE1 and the second connection electrode CNE2 may be omitted. According to an embodiment, an additional connection electrode may be further provided to connect the light emitting element OLE and the transistor TR. An electrical connection method between the light emitting element OLE and the transistor TR may be changed in various ways depending on the number of the insulating layers disposed between the light emitting element OLE and the transistor TR and should not be particularly limited.

The display element layer DP-OL may be disposed on the circuit layer DP-CL. The display element layer DP-OL may include the light emitting element OLE and a pixel definition layer PDL. The light emitting element OLE may be electrically connected to the transistor TR to form the pixel PX and may be disposed in the display area DP-DA to emit the light. As an example, the light emitting element OLE may include an organic light emitting element, a quantum light emitting element, a micro-LED light emitting element, or a nano-LED light emitting element, however, the present disclosure should not be limited thereto or thereby. According to an embodiment, the light emitting element OLE may be implemented in various ways as long as the light emitting element OLE emits the light or an amount of the light is controlled in response to an electrical signal.

The light emitting element OLE may include a first electrode AE, a hole control layer HCL, a light emitting layer EML, an electron control layer ECL, and a second electrode CE. The first electrode AE may be disposed on the sixth insulating layer INS6. The first electrode AE may be connected to the second connection electrode CNE2 via a contact hole CH3 defined through the sixth insulating layer INS6.

The pixel definition layer PDL may be disposed on the first electrode AE and the sixth insulating layer INS6 and may expose at least a portion of the first electrode AE. That is, a light emitting opening PX_OP may be defined through the pixel definition layer PDL to expose at least the portion of the first electrode AE to outside the pixel definition layer PDL. The portion of the first electrode AE exposed through the light emitting opening PX_OP may correspond to the light emitting area PA.

The pixel definition layer PDL may be formed of a polymer resin. As an example, the pixel definition layer PDL may include a polyacrylate-based resin or a polyimide-based resin. The pixel definition layer PDL may further include an inorganic material in addition to the polymer resin. According to an embodiment, the pixel definition layer PDL may include an inorganic material. As an example, the pixel definition layer PDL may include silicon nitride ($SiN_x$), silicon oxide ($SiO_x$), or silicon oxynitride ($SiO_xN_y$).

The pixel definition layer PDL may include a light absorbing material. The pixel definition layer PDL may include a black coloring agent. The black coloring agent may include a black pigment or a black dye. The black coloring agent may include a metal material, such as carbon black, chrome, etc., or an oxide thereof.

The light emitting layer EML may be disposed on the first electrode AE. The light emitting layer EML may be disposed in an area corresponding to the light emitting opening PX_OP of the pixel definition layer PDL, however, should not be limited thereto or thereby. According to an embodiment, the light emitting layer EML may extend toward an upper surface of the pixel definition layer PDL and may be commonly disposed over the pixels PX. That is, the light emitting layer EML in the light emitting opening PX_OP may extend along a sidewall of an underlying layer at the light emitting opening PX_OP and out of the light emitting opening PX_OP, to extend along the upper surface of the pixel definition layer PDL.

The light emitting layer EML may provide a light with a predetermined color. The light emitting layer EML may include an organic light emitting material and/or an inorganic light emitting material. As an example, the light emitting layer EML may include a fluorescent or phosphorescent material, an organometallic complex light emitting material, or a quantum dot. FIG. 5B shows the light emitting layer EML that is patterned and has a single-layer structure, however, should not be limited thereto or thereby. The light emitting layer EML may have a multiple-layer structure. As an example, the light emitting layer EML may include a main light emitting layer and an auxiliary light emitting layer disposed on the main light emitting layer. The main light emitting layer and the auxiliary light emitting layer may have a thickness changed depending on a wavelength of the light emitted therefrom, and a resonant distance of the light emitting element OLE may be controlled by providing the auxiliary light emitting layer. In addition, as the auxiliary light emitting layer is provided, a color purity of the light emitted from the light emitting layer EML may be improved.

The second electrode CE may be disposed on the light emitting layer EML. The second electrode CE may be commonly disposed over the pixels PX. The second electrode CE may receive a common voltage, and the second electrode CE may be referred to as a common electrode.

The light emitting element OLE may further include light emitting functional layers disposed between the first electrode AE and the second electrode CE. As an example, the light emitting element OLE may include the hole control layer HCL disposed between the first electrode AE and the light emitting layer EML and the electron control layer ECL disposed between the light emitting layer EML and the second electrode CE. The hole control layer HCL and the electron control layer ECL may be commonly disposed over the pixels PX.

A first voltage may be applied to the first electrode AE via the transistor TR, and the common voltage may be applied to the second electrode CE. Holes and electrons, which are injected into the light emitting layer EML, may be recombined with each other to generate excitons. The light emitting element OLE may emit the light through the display area DP-DA when the excitons return to a ground state from an excited state.

The encapsulation layer TFE may be disposed on the display element layer DP-OL and may cover the light emitting element OLE. That is, the encapsulation layer TFE may encapsulate the light emitting element OLE. The encapsulation layer TFE may include a plurality of encapsulation layers EN1 to EN3, and each of the encapsulation layers EN1 to EN3 may include an inorganic layer or an organic layer.

A first encapsulation layer EN1 and a third encapsulation layer EN3 may include an inorganic layer and may protect the light emitting element OLE from moisture and/or oxygen. As an example, the inorganic layer may include at least one of aluminum oxide, titanium oxide, silicon oxide, silicon nitride, silicon oxynitride, zirconium oxide, and hafnium oxide, however, should not be limited thereto or thereby.

A second encapsulation layer EN2 may include an organic layer and may protect the light emitting element OLE from a foreign substance such as dust particles. As an example, the organic layer may include an acrylic-based resin, however, the material of the organic layer should not be limited thereto or thereby.

The input sensor IS may be disposed on the display panel DP. The input sensor IS may be disposed directly on the display panel DP without a separate adhesive member. That is, the input sensor IS may be formed on a base surface provided by the display panel DP through successive processes after the display panel DP is formed, however, should not be limited thereto or thereby. According to an embodiment, the input sensor IS may be attached to an upper surface of the display panel DP by an adhesive member after being manufactured through a separate process from the display panel DP.

The input sensor IS may include a base insulating layer TBS, a first sensing pattern CTL1, a second sensing pattern CTL2, and a sensing insulating layer TINS.

The base insulating layer TBS may be disposed on the thin film encapsulation layer TFE. The base insulating layer TBS may be in contact with the third encapsulation layer EN3 that is disposed at an uppermost position of the thin film encapsulation layer TFE. The base insulating layer TBS may include an inorganic layer.

The first sensing pattern CTL1 may be disposed on the base insulating layer TBS. The sensing insulating layer TINS may be disposed on the base insulating layer TBS to cover the first sensing pattern CTL1. The sensing insulating layer TINS may include an inorganic layer or an organic layer. The second sensing pattern CTL2 may be disposed on the sensing insulating layer TINS.

The first and second sensing patterns CTL1 and CTL2 may overlap the non-light-emitting area NPA. The first and second sensing patterns CTL1 and CTL2 may have a mesh shape defined to correspond to the non-light-emitting area NPA. Accordingly, the input sensor IS may not affect a light emitting efficiency of the light emitting element OLE, however, the present disclosure should not be limited thereto or thereby. According to an embodiment, sensing patterns of the input sensor IS may include a transparent conductive material and may have a single-pattern shape overlapping the light emitting elements OLE.

The first and second sensing patterns CTL1 and CTL2 may include a conductive material. The first and second sensing patterns CTL1 and CTL2 may be sensors of the input sensor IS. As an example, the first and second sensing patterns CTL1 and CTL2 having the mesh shape may be separated from each other in a predetermined area and may form an electric field to sense the external input. That is, the first and second sensing patterns CTL1 and CTL2 may be solid material portions spaced apart from each other with sensing pattern openings therebetween, to provide the mesh shape. The sensing pattern openings may correspond to the light emitting area PA. A portion of the second sensing pattern CTL2 may be connected to the first sensing pattern CTL1.

The anti-reflective layer RPL may be disposed on the input sensor IS. The anti-reflective layer RPL may reduce a reflectance with respect to the external light and may improve a light emitting efficiency of the display panel DP. According to an embodiment, the anti-reflective layer RPL may be disposed directly on the input sensor IS. The anti-reflective layer RPL may include a partition layer BM, color filters CF, and an overcoating layer PINS.

The partition layer BM may be disposed on the sensing insulating layer TINS to cover the second sensing pattern CTL2, however, should not be limited thereto or thereby. According to an embodiment, the input sensor IS may further include a separate insulating layer that covers the second sensing pattern CTL2, and the partition layer BM may be disposed on the separate insulating layer.

The partition layer BM may be provided with a partition opening B_OP defined therethrough to overlap the light emitting area PA and the light emitting opening PX_OP. When viewed in a plane, a size of the partition opening B_OP may be greater than a size of the light emitting opening PX_OP.

The partition layer BM may absorb the light and may block the light. The partition layer BM may include a light absorbing material. As an example, the partition layer BM may have a black color and may include a black coloring agent. The black coloring agent may include a black pigment or a black dye. The black coloring agent may include a metal material, such as carbon black, chrome, etc., or an oxide thereof The color filters CF may be disposed on the sensing insulating layer TINS and the partition layer BM. The color filters CF may be disposed corresponding to the partition openings B_OP, respectively. The color filters CF may overlap the light emitting area PA. The color filters CF may absorb a light in a specific wavelength region according to a color of the light emitted through the light emitting area PA.

The overcoating layer PINS may be disposed on the color filters CF. The overcoating layer PINS may include an organic material. The overcoating layer PINS may cover the color filters CF and may provide a flat upper surface. However, according to an embodiment, the overcoating layer PINS may be omitted.

In a case where the external light incident to the display panel DP is provided to outside the electronic device ED after being reflected by the display panel DP, like a mirror, the external light may be visible from the outside. The anti-reflective layer RPL may include the color filters CF that display the same colors as those of the pixels PX to prevent the above-mentioned phenomenon. The color filters CF may filter the external light to have the same color as the pixels PX and may reduce the reflectance with respect to the external light.

Figure 6A:
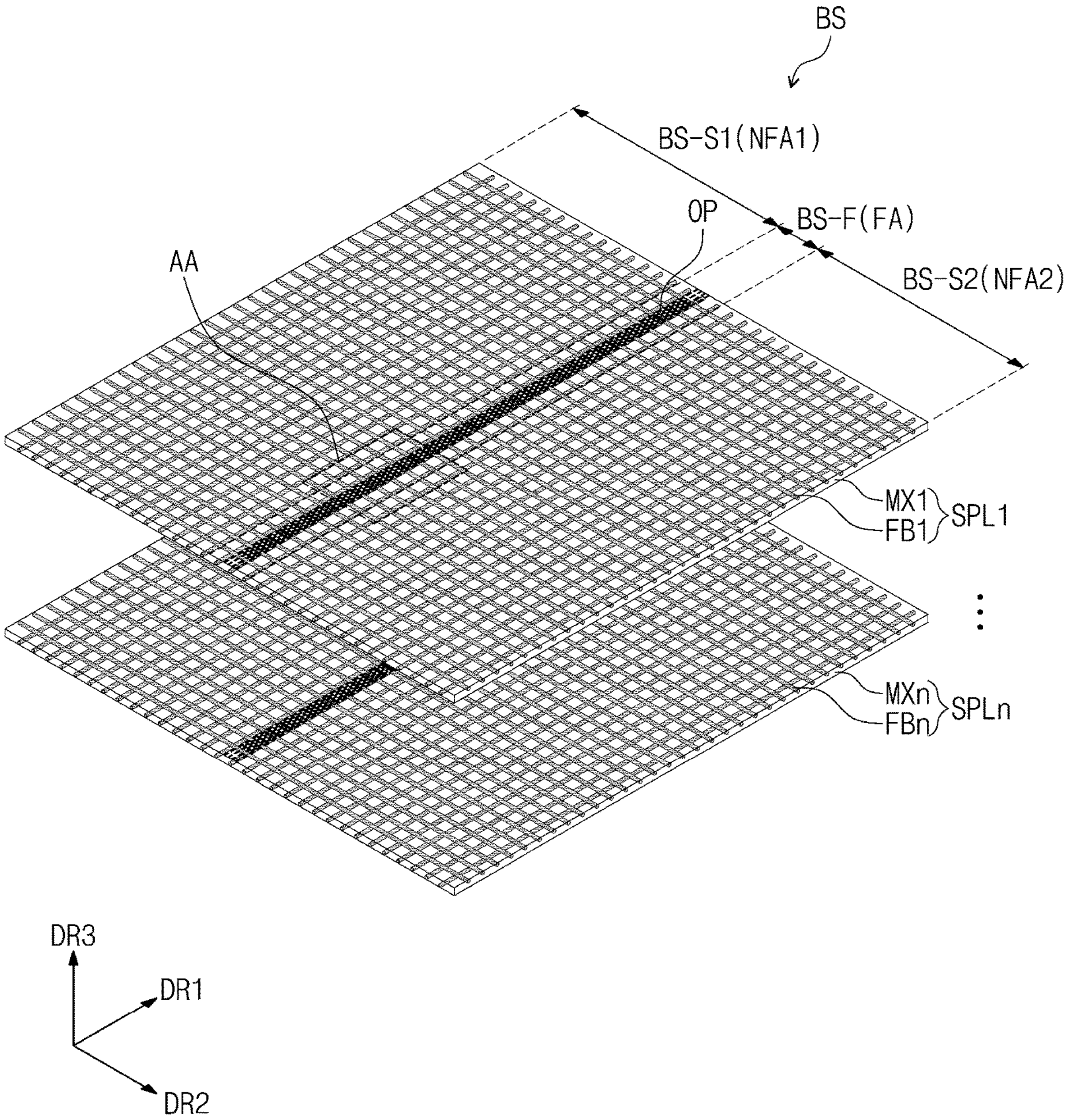
FIG. 6A is a perspective view of a substrate of a digitizer according to an embodiment of the present disclosure.
Figure 6B:
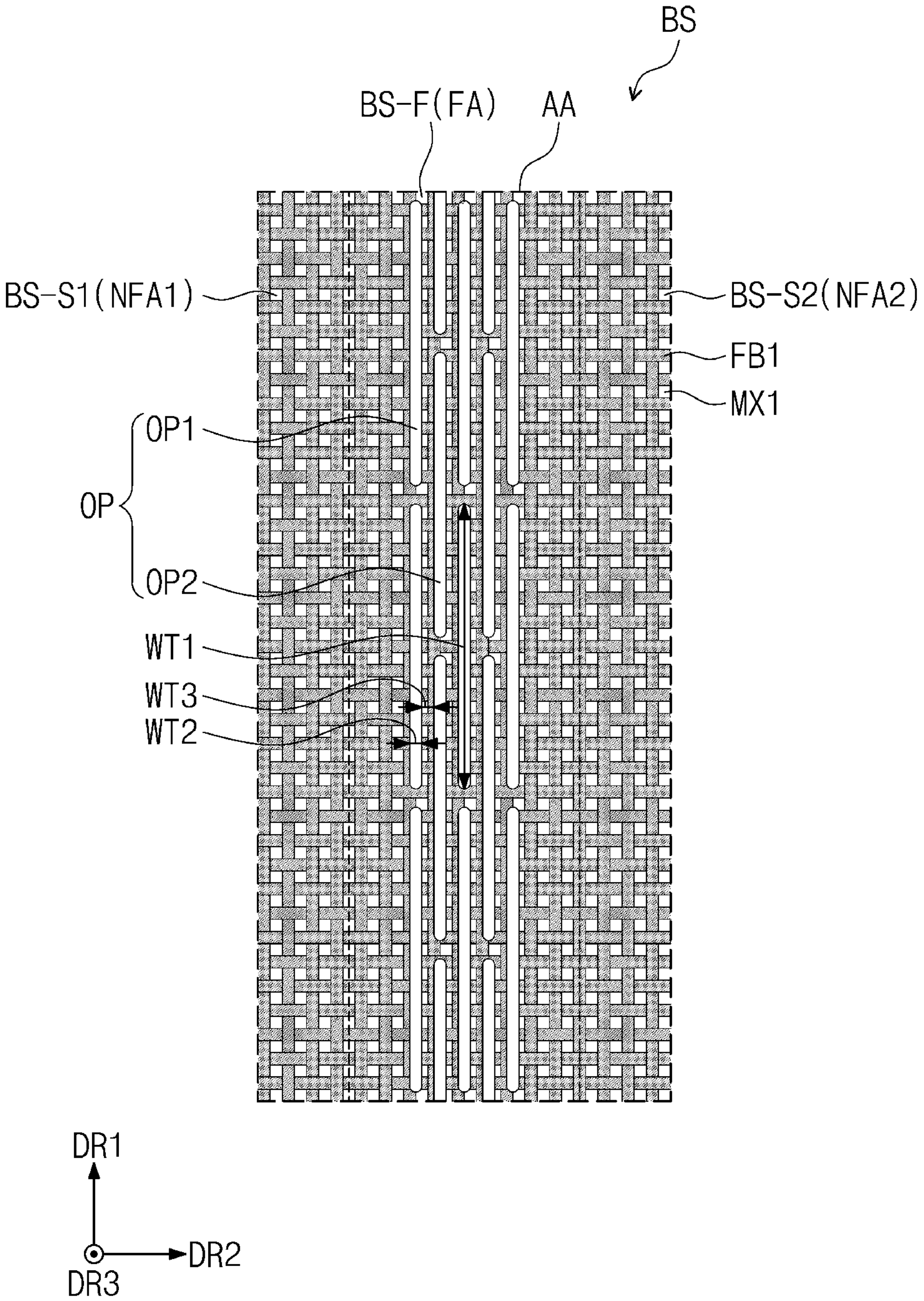
FIG. 6B is an enlarged plan view of the substrate of the digitizer in an area AA of FIG. 6A according to an embodiment of the present disclosure.

FIG. 6A is a perspective view of the substrate BS of the digitizer DGT according to an embodiment of the present disclosure. FIG. 6B is an enlarged plan view of the substrate BS of the digitizer DGT in an area AA of FIG. 6A according to an embodiment of the present dis closure.

Referring to FIG. 6A, the substrate BS of the digitizer DGT (refer to FIG. 4) may include a first support portion BS-S1 corresponding to the first non-folding area NFA1, a second support portion BS-S2 corresponding to the second non-folding area NFA2, and a folding portion BS-F corresponding to the folding area FA. The first support portion BS-S1 may correspond to the first portion BS1 of the substrate BS described with reference to FIG. 4, and the second support portion BS-S2 may correspond to the second portion BS2 of the substrate BS described with reference to FIG. 4. The first support portion BS-S1 and the second support portion BS-S2 may be spaced apart from each other with the folding portion BS-F interposed therebetween, in the second direction DR2. The first support portion BS-S1, the folding portion BS-F, and the second support portion BS-S2 may together form an integral plate shape.

The substrate BS may include a plurality of sub-substrates SPL1 to SPLn (or sub-layers). The sub-substrates SPL1 to SPLn may be sequentially stacked in the third direction DR3. FIG. 6A is an exploded perspective view of 'n' sub-substrates SPL1 to SPLn arranged in the third direction DR3.

The number of the sub-substrates SPL1 to SPLn included in the substrate BS may be changed depending on the thickness and the rigidity of the digitizer DGT (refer to FIG. 4) applied to the electronic device ED (refer to FIG. 4). The thickness of the substrate BS may be controlled by adjusting the number of the sub-substrates SPL1 to SPLn included in the substrate BS. Accordingly, the digitizer DGT having the thickness and the rigidity sufficient for supporting the electronic device ED may be easily manufactured. According to an embodiment, the substrate BS may include two to five sub-substrates SPL1 to SPLn. However, the number of the sub-substrates SPL1 to SPLn should not be limited thereto or thereby. However, according to an embodiment, the digitizer DGT may be implemented by a single substrate BS, and in this case, the number of the sub-substrate is one.

The sub-substrates SPL1 to SPLn may include matrix portions MX1 to MXn, respectively, and reinforced fibers FB1 to FBn, respectively. The reinforced fibers FB1 to FBn may include at least one of a carbon fiber and a glass fiber. The reinforced fibers FB1 to FBn within a respective sub-substrate may form a reinforced fiber layer.

The reinforced fibers FB1 to FBn may extend in one direction and may be arranged in a direction crossing the extension direction thereof. The reinforced fibers FB1 to FBn may include a plurality of fibers arranged crossing with each other, and an arrangement of the fibers will be described in detail with reference to FIGS. 7A and 7B.

A lattice pattern may be defined through the folding portion BS-F of the substrate BS. As an example, a plurality of openings OP may be defined through the folding portion BS-F. The openings OP may be arranged in a lattice form with a predetermined rule, and the lattice pattern may be formed in the folding portion BS-F. According to an embodiment, a width in the second direction DR2 of a total area in which the openings OP are defined may be smaller than a total width of the folding area FA.

Referring to FIG. 6B, the openings OP of the substrate BS may be arranged in a matrix form defined by columns each formed of openings OP arranged in the first direction DR1 and rows each formed of openings OP arranged in the second direction DR2. In this case, the openings OP may include a plurality of first openings OP1 arranged staggered with a plurality of second openings OP2 in the second direction DR2. Each of the first openings OP1 arranged in one column may extend in the first direction DR1, and the first openings OP1 may be spaced apart from each other in the first direction DR1. Each of the second openings OP2 may be spaced apart from the first openings OP1 in the second direction DR2. Each of the second openings OP2 arranged in one column may extend in the first direction DR1, and the second openings OP2 may be spaced apart from each other in the first direction DR1. However, these are merely examples. According to an embodiment, the openings OP may be arranged parallel to each other in the second direction DR2 and should not be particularly limited.

The openings OP may be formed in various methods. As an example, the openings OP may be formed through a laser process or a micro-blast process, however, should not be limited thereto or thereby.

An area of the folding portion BS-F of the substrate BS may be reduced due to the openings OP. That is, a planar area of solid portions of the substrate BS at the folding portion BS-F may be reduced owing to the openings OP at which solid portions are excluded or removed from the substrate BS. Accordingly, the flexibility of the folding portion BS-F when the openings OP are defined may be improved compared to that when the openings OP are not defined.

Each of the openings OP may have a first length WT1 in the first direction DR1 that is the extension direction thereof and may have a first width WT2 in the second direction DR2. The first length WT1 of each of the openings OP may be greater than the first width WT2. According to an embodiment, the first length WT1 of each of the openings OP may be equal to or greater than about 0.05 millimeter (mm) and equal to or smaller than about 0.2 mm. When the first length WT1 is smaller than about 0.05 mm, a process time for precision machining may increase, and when the first length WT1 is greater than about 0.2 mm, the lattice pattern of the openings OP may be visible from the outside.

Among the openings OP, the first opening OP1 and the second opening OP2, which are adjacent to each other in the second direction DR2, may be spaced apart from each other by a second width WT3 of the substrate BS, with a portion of the folding portion BS-F interposed therebetween. The portion may include a solid portion of the substrate BS and/or a mesh opening. According to an embodiment, the second width WT3 may be equal to or greater than about 0.05 mm and equal to or smaller than about 0.3 mm. In a case where the second width WT3 satisfies the above-mentioned range, damage on the folding portion BS-F may be reduced when the openings OP are formed, and a process time to form the openings OP may be reduced. When the second width WT3 is smaller than about 0.05 mm, the process time for precision machining may increase, or the folding portion BS-F may be damaged, and as a result, the openings OP adjacent to each other in the second direction DR2 may be connected to each other. When the second width WT3 is greater than about 0.3 mm, folding characteristics of the folding portion BS-F of the substrate BS may be deteriorated, and the damage such as a crack may occur due to a stress generated by the folding portion BS-F.

Figure 7A:
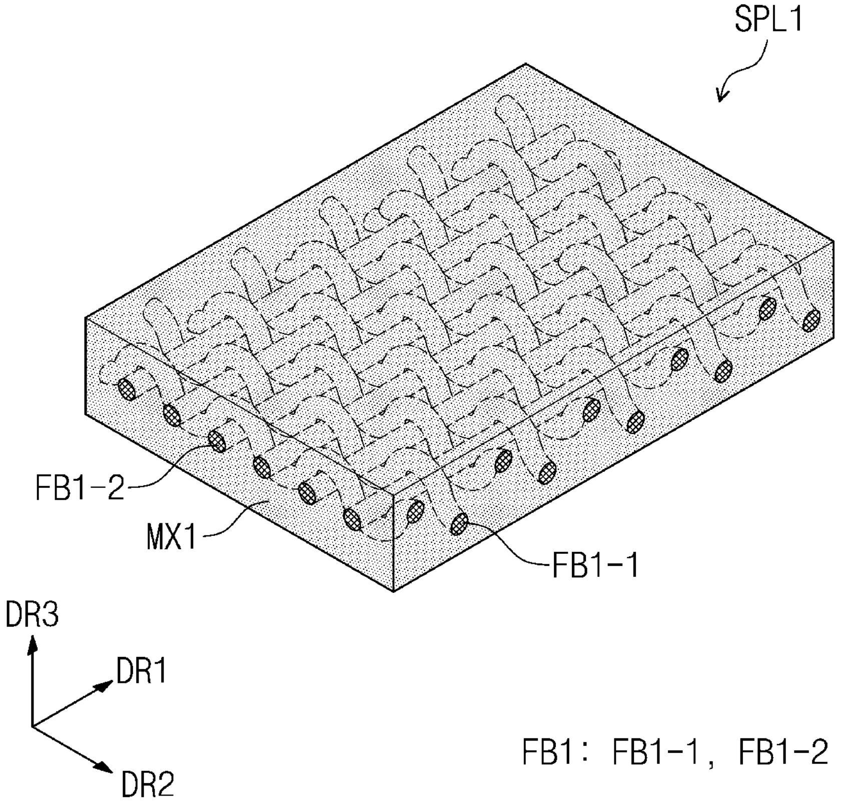
FIGS. 7A and 7B are enlarged perspective views of substrates of digitizers according to embodiments of the present disclosure.
Figure 7B:
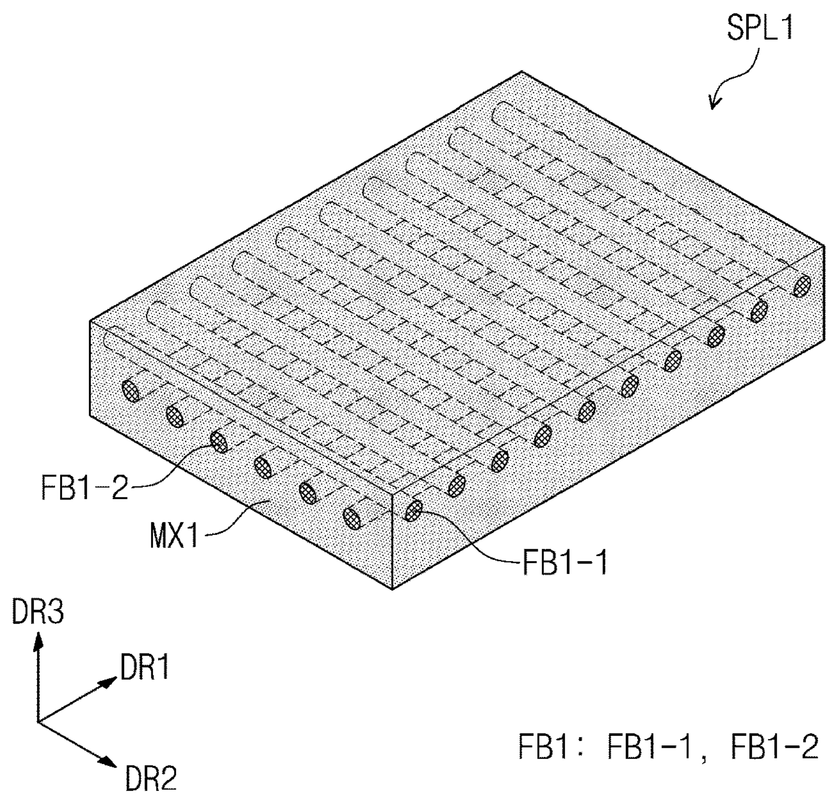
Figure 7C:
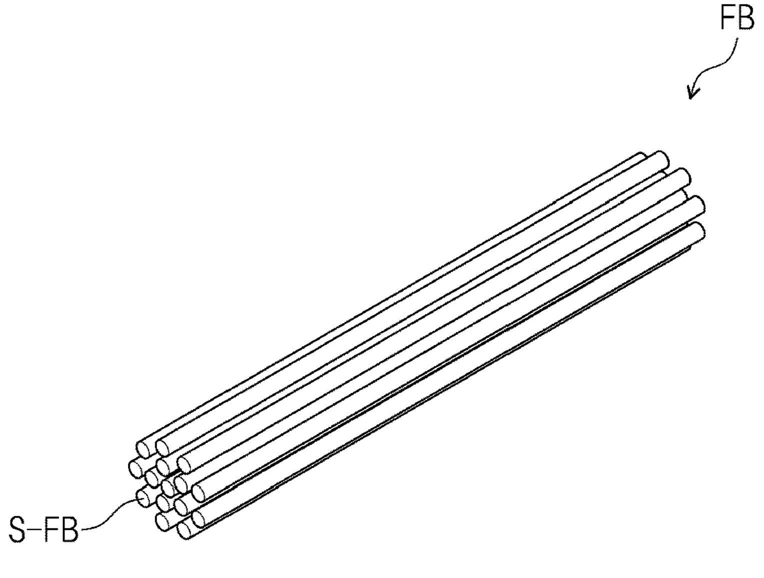
FIG. 7C is an enlarged perspective view of a reinforced fiber according to an embodiment of the present disclosure.

FIGS. 7A and 7B are enlarged perspective views of a sub-substrate of a digitizer DGT according to embodiments of the present disclosure. FIG. 7C is an enlarged perspective view of a reinforced fiber FB according to an embodiment of the present disclosure.

FIGS. 7A and 7B are enlarged perspective views of sub-substrates SPL1, and the sub-substrates SPL1 of FIGS. 7A and 7B have substantially the same configurations except arrangements of reinforced fibers FB1-1 and FB1-2 within a reinforced fiber layer.

Referring to FIGS. 7A and 7B, the reinforced fibers FB1 may include first reinforced fibers FB1-1 and second reinforced fibers FB1-2 extending in a direction different from a direction in which the first reinforced fibers FB1-1 extend. The first reinforced fibers FB1-1 may extend in the second direction DR2 and may be arranged in the first direction DR1. The second reinforced fibers FB1-2 may extend in the first direction DR1 and may be arranged in the second direction DR2. The first reinforced fibers FB1-1 may cross the second reinforced fibers FB1-2 when viewed in a plane. As the first reinforced fibers FB1-1 are arranged crossing the second reinforced fibers FB1-2, a rigidity of the sub-substrate SPL1 may be improved.

The first reinforced fibers FB1-1 may be woven with the second reinforced fibers FB1-2 as shown in FIG. 7A. That is, each first reinforced fiber FB1-1 may cross the second reinforced fibers FB1-2 by going over one, then under the next, and so on (e.g., extend both above and below the second reinforced fibers FB1-2). However, the arrangement of the first reinforced fibers FB1-1 and the second reinforced fibers FB1-2 should not be limited thereto or thereby.

As shown in FIG. 7B, the second reinforced fibers FB1-2 and the first reinforced fibers FB1-1 may be sequentially stacked in the third direction DR3. Each of the second reinforced fibers FB1-2 and the first reinforced fibers FB1-1 may form a same sub-layer of reinforced fibers. As shown in FIG. 7B, a sub-layer of the first reinforced fibers FB1-1 may be disposed on a sub-layer of the second reinforced fibers FB1-2 and may be arranged in the first direction DR1, however, should not be limited thereto or thereby. According to an embodiment, the first reinforced fibers FB1-1 may be disposed under the second reinforced fibers FB1-2.

The first and second reinforced fibers FB1-1 and FB1-2 crossing each other may be distributed in the matrix portion MX1. The matrix portion MX1 may include a polymer resin. As an example, the matrix portion MX1 may include a polyepoxy-based resin, a polyester-based resin, a polyamide-based resin, a polycarbonate-based resin, a polypropylene-based resin, a polybutylene-based resin, or a polyvinyl ester-based resin, however, a material for the matrix portion MX1 should not be limited thereto or thereby. The matrix portion MX1 may be filled between the first and second reinforced fibers FB1-1 and FB1-2, and the first and second reinforced fibers FB1-1 and FB1-2 may be adhered to each other by the matrix portion MX1.

The sub-substrate SPL1 may further include a dye or a pigment, which are dispersed in the matrix portion MX1. As an example, the sub-substrate SPL1 may include a black pigment or a black dye distributed in the matrix portion MX1. Accordingly, the substrate BS (refer to FIG. 4) of the digitizer DGT (refer to FIG. 4) may have a black color, and thus, components disposed under the digitizer DGT (refer to FIG. 4) may be prevented from being viewed from the outside.

The sub-substrate SPL1 may further include inorganic particles dispersed in the matrix portion MX1. As an example, the inorganic particles may include silica, barium sulphate, barium titanate, titanium oxide, sintered talc, zinc borate, zinc titanate, clay, alumina, mica, or boehmite. The inorganic particles dispersed in the matrix portion MX1 may complement the rigidity of the sub-substrate SPL1.

Referring to FIG. 7C, the reinforced fiber FB may be a material consisting of a fiber strand S-FB provided in plural including multiple fiber strands S-FB. As an example, the multiple fiber strands S-FB may be bundled together to form one reinforced fiber FB. That is, each of the first reinforced fiber FB1-1 and the second reinforced fiber FB1-2 may be implemented by a bundle of multiple fiber strands S-FB together forming the reinforced fiber FB.

Figure 8:
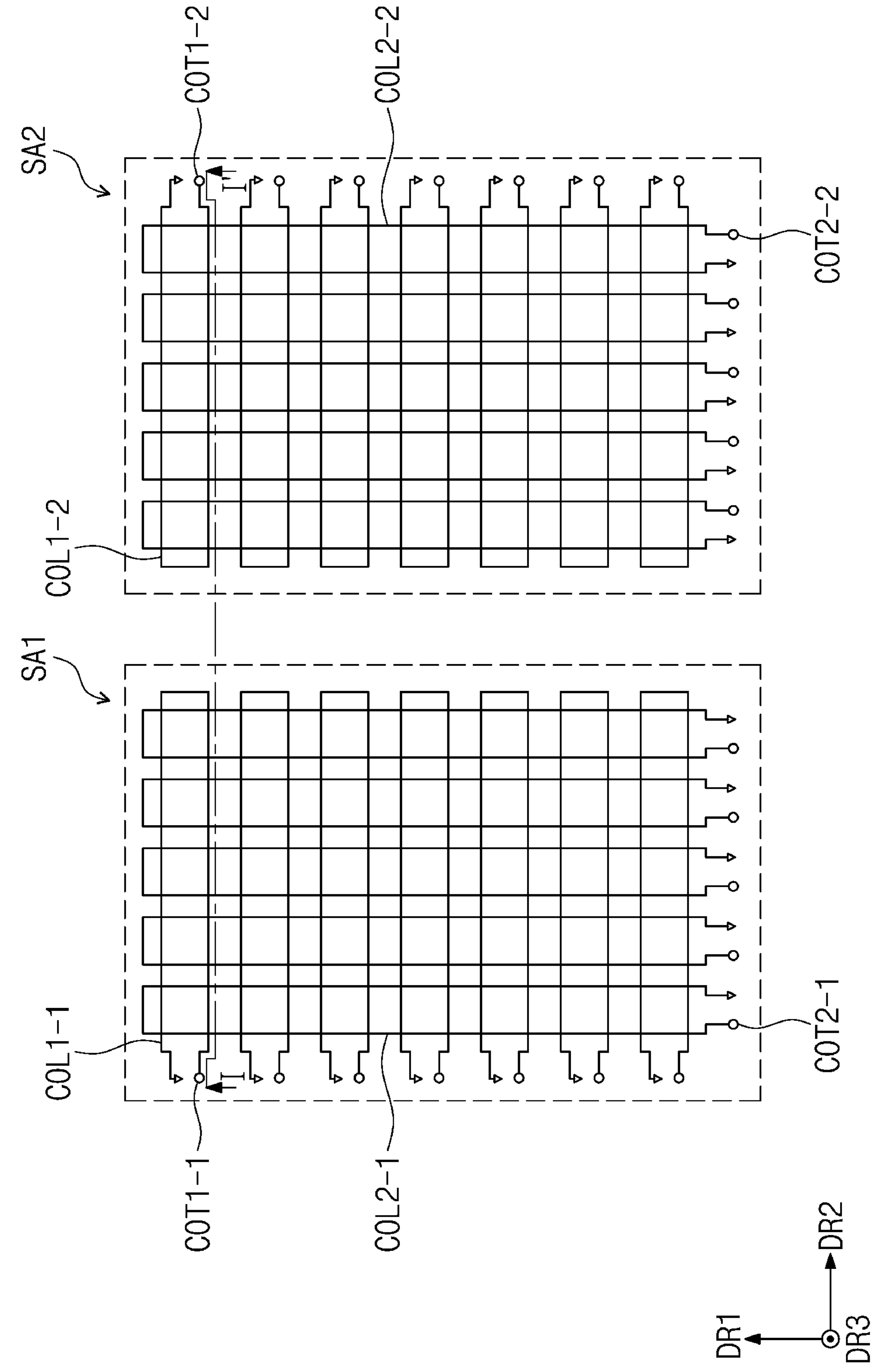
FIG. 8 is a plan view of a digitizer according to an embodiment of the present disclosure.
Figure 9A:
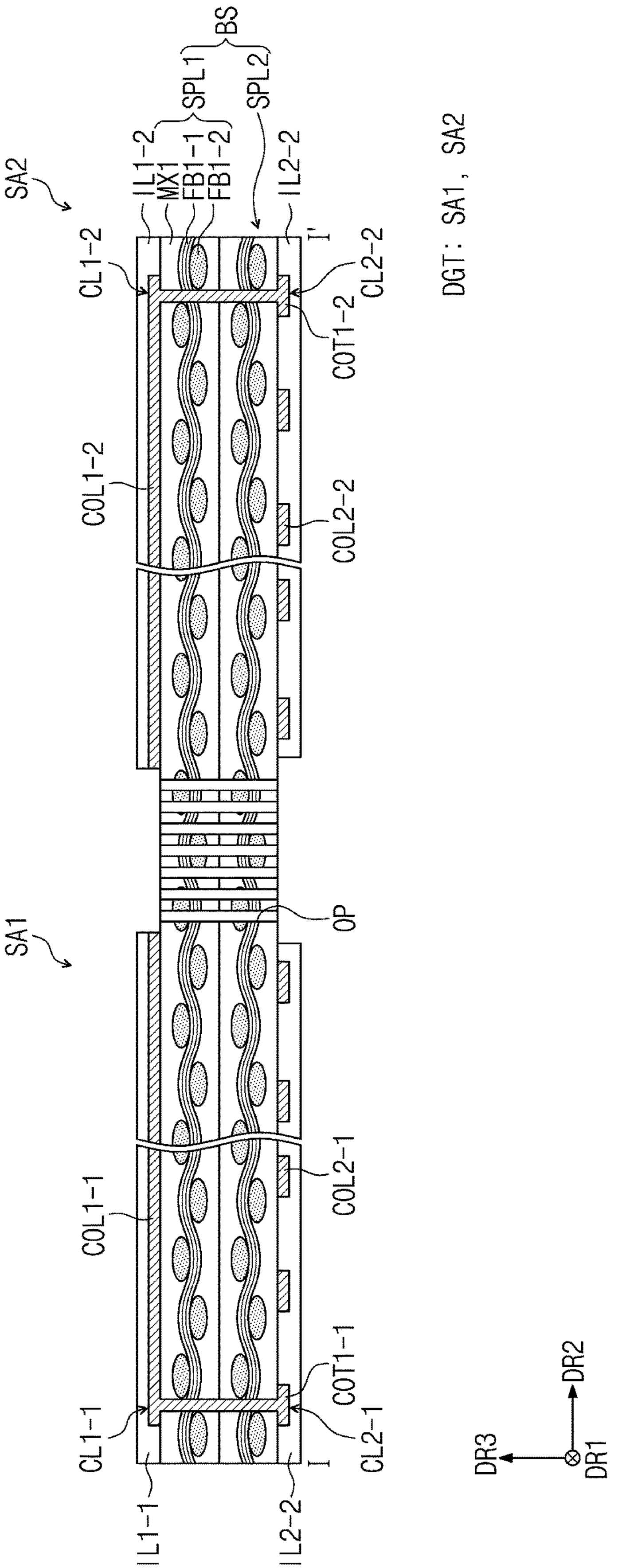
FIGS. 9A and 9B are cross-sectional views of digitizers taken along a line I-I' of FIG. 8 according to embodiments of the present disclosure.
Figure 9B:
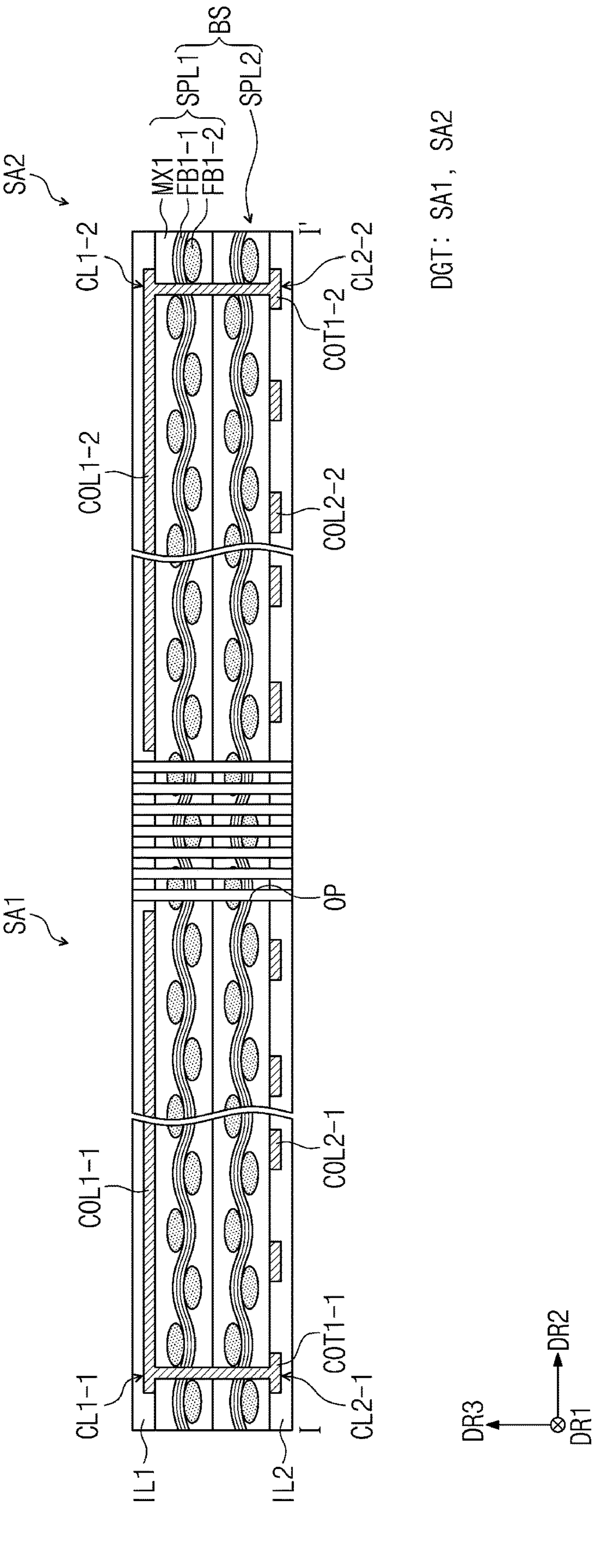

FIG. 8 is a plan view of sensing portions of a digitizer DGT according to an embodiment of the present disclosure. FIGS. 9A and 9B are cross-sectional views of a digitizer DGT taken along a line I-I' of FIG. 8 according to embodiments of the present disclosure. FIG. 8 schematically shows a plurality of coils included in the first sensing portion SA1 and the second sensing portion SA2, and for the convenience of explanation, a substrate layer overlapping the coils is omitted.

Referring to FIG. 8, the first sensing portion SA1 may include first coils COL1-1, second coils COL2-1, first terminals COT1-1, and second terminals COT2-1, and the second sensing portion SA2 may include first coils COL1-2, second coils COL2-2, first terminals COT1-2, and second terminals COT2-2. The first coils COL1-1 and the second coils COL2-1 of the first sensing portion SA1 may respectively correspond to the first conductive patterns CL1-1 and the second conductive patterns CL2-1 of the first sensing portion SA1 of FIG. 4. The first coils COL1-2 and the second coils COL2-2 of the second sensing portion SA2 may respectively correspond to the first conductive patterns CL1-2 and the second conductive patterns CL2-2 of the second sensing portion SA2 of FIG. 4. The first coils COL1-1 and COL1-2 may be referred to as driving coils, and the second coils COL2-1 and COL2-2 may be referred to as sensing coils, however, should not be limited thereto or thereby. According to an embodiment, the first coils COL1-1 and COL1-2 may be referred to as the sensing coils, and the second coils COL2-1 and COL2-2 may be referred to as the driving coils.

Each of the first coils COL1-1 and COL1-2 may extend in the second direction DR2 and may be arranged in the first direction DR1 to be spaced apart from each other. The first coils COL1-1 of the first sensing portion SA1 may be spaced apart from the first coils COL1-2 of the second sensing portion SA2 in the second direction DR2. Each of the second coils COL2-1 and COL2-2 may extend in the first direction DR1 and may be arranged in the second direction DR2 to be spaced apart from each other. The second coils COL2-1 of the first sensing portion SA1 may be spaced apart from the second coils COL2-2 of the second sensing portion SA2 in the second direction DR2.

In an embodiment, different from the arrangement of the coils shown in FIG. 8, the first coils COL1-1 and COL1-2 may be arranged such that coils adjacent to each other may overlap each other, and in this case, a bridge pattern may be disposed in an area in which each of the first coils COL1-1 and COL1-2 cross each other. Similarly, the second coils COL2-1 and COL2-2 may be arranged such that coils adjacent to each other may overlap each other.

Each coil may have distal ends including a first end and a second end opposite to each other along a length of the coil. Each coil may have an open loop shape (like a "U") in the plan view. Referring to FIG. 8, the distal ends of a same coil are disposed at a same side of the respective sensing portion of the digitizer DGT. First ends among the distal ends of the first coils COL1-1 and COL1-2 may be connected to the first terminals COT1-1 and COT1-2, respectively, and an alternating current signal may be sequentially applied to the first coils COL1-1 and COL1-2 respectively via the first terminals COT1-1 and COT1-2. The other terminals (e.g., second ends among the distal ends) of the first coils COL1-1 and COL1-2, which are different from the first terminals COT1-1 and COT1-2 of the first coils COL1-1 and COL1-2, may be grounded (e.g., first ground terminals). Signal lines may be respectively connected to the first terminals COT1-1 and COT1-2 of the first coils COL1-1 and COL1-2.

When a current flows through the first coils COL1-1 and COL1-2, a magnetic field line may be induced between the first coils COL1-1 and COL1-2 and the second coils COL2-1 and COL2-2. The second coils COL2-1 and COL2-2 may sense an induced electromagnetic force emitted from the pen PN (refer to FIG. 1A) and may output the induced electromagnetic force to the second terminals COT2-1 and COT2-2 connected to the second coils COL2-1 and COL2-2 as a sensing signal. The other terminals of the second coils COL2-1 and COL2-2, which are different from the second terminals COT2-1 and COT2-2 of the second coils COL2-1 and COL2-2 may be grounded (e.g., second ground terminals). Signal lines may be respectively connected to the second terminals COT2-1 and COT2-2 of the second coils COL2-1 and COL2-2.

Referring to FIGS. 9A and 9B, the first sensing portion SA1 and the second sensing portion SA2 may be formed on a substrate BS that is formed in an integral shape. The substrate BS of the digitizer DGT may include a fiber reinforced composite material, and descriptions of the substrate BS are the same as described above.

The substrate BS may include one or more sub-substrates each of which includes a plurality of reinforced fibers, and FIGS. 9A and 9B show the substrate BS including two sub-substrates SPL1 and SPL2. However, the number of the sub-substrates included in the substrate BS should not be limited thereto or thereby.

A first sub-substrate SPL1 included in the substrate BS may include a matrix portion MX1 and first and second reinforced fibers FB1-1 and FB1-2 interlaced with each other. The second sub-substrate SPL2 may have substantially the same configuration as that of the first sub-substrate SPL1.

The substrate BS may be provided with a plurality of openings OP defined therethrough in an area corresponding to the folding area FA (refer to FIG. 4). The openings OP may be formed through each of the sub-substrates included in the substrate BS. FIGS. 9A and 9B show the openings OP formed through the first and second sub-substrates SPL1 and SPL2 as a representative example. The respective openings define in the first and second sub-substrates SPL1 and SPL2 are aligned with each other, to form the openings OP of the digitizer DGT.

The first conductive patterns CL1-1 and CL1-2 may be disposed on one surface (e.g., a surface at a same side) of the substrate BS. As an example, the first conductive patterns CL1-1 and CL1-2 may be disposed on an upper surface of the substrate BS which is closest to the display panel DP. The first conductive patterns CL1-1 and CL1-2 may correspond to the first coils COL1-1 and COL1-2 formed on the one surface of the substrate BS. The first coils COL1-1 of the first sensing portion SA1 may be spaced apart from the first coils COL1-2 of the second sensing portion SA2 with the openings OP interposed therebetween in the second direction DR2. The first coils COL1-1 and COL1-2 may not overlap the openings OP when viewed in the plane. That is, the first coils COL1-1 and COL1-2 may be disconnected from each other at the folding portion BS-F.

The second conductive patterns CL2-1 and CL2-2 may be disposed on the other surface of the substrate BS, which is opposite to the one surface of the substrate BS. As an example, the second conductive patterns CL2-1 and CL2-2 may be disposed on a lower surface of the substrate BS which is furthest from the display panel DP. The second conductive patterns CL2-1 and CL2-2 may correspond to the second coils COL2-1 and COL2-2 formed on the other surface of the substrate BS. The second coils COL2-1 of the first sensing portion SA1 may be spaced apart from the second coils COL2-2 of the second sensing portion SA2 with the openings OP interposed therebetween in the second direction DR2. The second coils COL2-1 and COL2-2 may not overlap the openings OP when viewed in the plane.

The second conductive patterns CL2-1 and CL2-2 may include (or define) the first terminals COT1-1 and COT1-2 and the second terminals COT2-1 and COT2-2 of FIG. 8. The first terminals COT1-1 and COT1-2 formed on the surface of the substrate BS different from the surface on which the first coils COL1-1 and COL1-2 are formed may be respectively connected to the first coils COL1-1 and COL1-2 via contact holes defined through the substrate BS. The first terminals COT1-1 and COT1-2 may be extended portions of the first coils COL1-1 and COL1-2 which are extended through the thickness of the substrate BS (at various contact holes of the substrate BS) and exposed to outside the substrate BS at the lower surface. As the substrate BS includes the fiber reinforced composite material, the contact holes may be easily formed through the substrate BS.

According to an embodiment, the digitizer DGT may further include an insulating layer. As an example, the digitizer DGT may include a first insulating pattern IL1-1 and a second insulating pattern IL1-2, which are disposed on the one surface of the substrate BS, and a third insulating pattern IL2-1 and a fourth insulating pattern IL2-2, which are disposed on the other surface of the substrate BS, as shown in FIG. 9A.

The first insulating pattern IL1-1 and the second insulating pattern IL1-2 may be disposed on the same layer, such as to be coplanar with each other and form a respective insulating layer. The first insulating pattern IL1-1 may cover the first conductive patterns CL1-1 of the first sensing portion SA1. The second insulating pattern IL1-2 may cover the first conductive patterns CL1-2 of the second sensing portion SA2.

The third insulating pattern IL2-1 and the fourth insulating pattern IL2-2 may be disposed on the same layer, such as to be coplanar with each other and form a respective insulating layer. The third insulating pattern IL2-1 may cover the second conductive patterns CL2-1 of the first sensing portion SA1, and the fourth insulating pattern IL2-2 may cover the second conductive patterns CL2-2 of the second sensing portion SA2.

The first insulating pattern IL1-1 may be spaced apart from the second insulating pattern IL1-2 in the second direction DR2, such as to be disconnected along the second direction DR2. The first insulating pattern IL1-1 and the second insulating pattern IL1-2 may be spaced apart from each other with the openings OP interposed therebetween, and the first insulating pattern IL1-1 and the second insulating pattern IL1-2 may not overlap the openings OP when viewed in the plane. The first insulating pattern IL1-1 which is disconnected along the second direction DR2 from the second insulating pattern IL1-2 may be considered as providing a single opening (e.g., a first single opening) of an insulating pattern layer, where the single opening corresponds to each of the openings OP.

The third insulating pattern IL2-1 may be spaced apart from the fourth insulating pattern IL2-2 with the openings OP interposed therebetween in the second direction DR2. The third insulating pattern IL2-1 which is spaced apart from the fourth insulating pattern IL2-2 may be considered as providing a single opening (e.g., a second single opening) corresponding to all of the openings OP. The third insulating pattern IL2-1 and the fourth insulating pattern IL2-2 may not overlap the openings OP when viewed in the plane.

Each of the first, second, third, and fourth insulating patterns IL1-1, IL1-2, IL2-1, and IL2-2 may include a polymer material. The first, second, third, and fourth insulating patterns IL1-1, IL1-2, IL2-1, and IL2-2 may protect the first conductive patterns CL1-1 and CL1-2 and the second conductive patterns CL2-1 and CL2-2.

In a process of manufacturing (or providing) the digitizer DGT, insulating layers may be formed on both of opposing surfaces of the substrate BS after the openings OP are formed through the substrate BS, and the insulating layers may be patterned to form the first and third insulating patterns IL1-1 and IL2-1 and the second and fourth insulating patterns IL1-2 and IL2-2 spaced apart from the first and third insulating patterns IL1-1 and IL2-1 with the openings OP interposed therebetween, respectively, however, should not be limited thereto or thereby. According to an embodiment, the insulating patterns IL1-1, IL1-2, IL2-1, and IL2-2 may be formed by depositing an insulating material on the sensing portions SA1 and SA2 such that the insulating patterns IL1-1, IL1-2, IL2-1, and IL2-2 do not overlap the openings OP. As the first, second, third, and fourth insulating patterns IL1-1, IL1-2, IL2-1, and IL2-2 are formed not to overlap with the openings OP, the flexibility of the digitizer DGT may be improved.

According to an embodiment, as shown in FIG. 9B, the digitizer DGT may include insulating layers IL1 and IL2, each of which is formed as a single layer on a substrate BS. Referring to FIG. 9B, a first insulating layer IL1 may be disposed on one surface of the substrate BS (e.g., an upper surface of the substrate BS), and a second insulating layer IL2 may be disposed on the other surface of the substrate BS (e.g., a lower surface of the substrate BS). The first insulating layer IL1 may be disposed on the upper surface of the substrate BS and may cover first conductive patterns CL1-1 and CL1-2 of a first sensing portion SA1 and a second sensing portion SA2. The second insulating layer IL2 may be disposed on the lower surface of the substrate BS and may cover second conductive patterns CL2-1 and CL2-2 of the first sensing portion SA1 and the second sensing portion SA2.

The first insulating layer IL1 may be formed on the upper surface of the substrate BS as an integral layer, and the second insulating layer IL2 may be formed on the lower surface of the substrate BS as an integral layer where insulating patterns are connected to each other at the folding portion BS-F. Each of the first insulating layer IL1 and the second insulating layer IL2 may be provided with a plurality of insulating openings (e.g., a plurality of first insulating openings and a plurality of second insulating openings, respectively) overlapping a plurality of openings OP of the substrate BS. The insulating openings formed through each of the first insulating layer IL1 and the second insulating layer IL2 may be disposed to overlap (or be aligned with) the openings OP formed through the substrate BS, and thus, openings obtained by the insulating openings connected to the openings OP may be formed through the insulating layers IL1 and IL2 and the substrate BS.

In the process of manufacturing (or providing) the digitizer DGT, a material layer of the first and second insulating layers IL1 and IL2 may be respectively formed on the upper and lower surfaces of the substrate BS to cover the conductive patterns CL1-1, CL1-2, CL2-1, and CL2-2. Then, the openings may be formed to penetrate through material layers of the first and second insulating layers IL1 and IL2 and the substrate BS in the third direction DR3. As the insulating layer openings are formed through the first and second insulating layers IL1 and IL2 and the substrate BS, the flexibility of the digitizer DGT may be improved.

Figure 10:
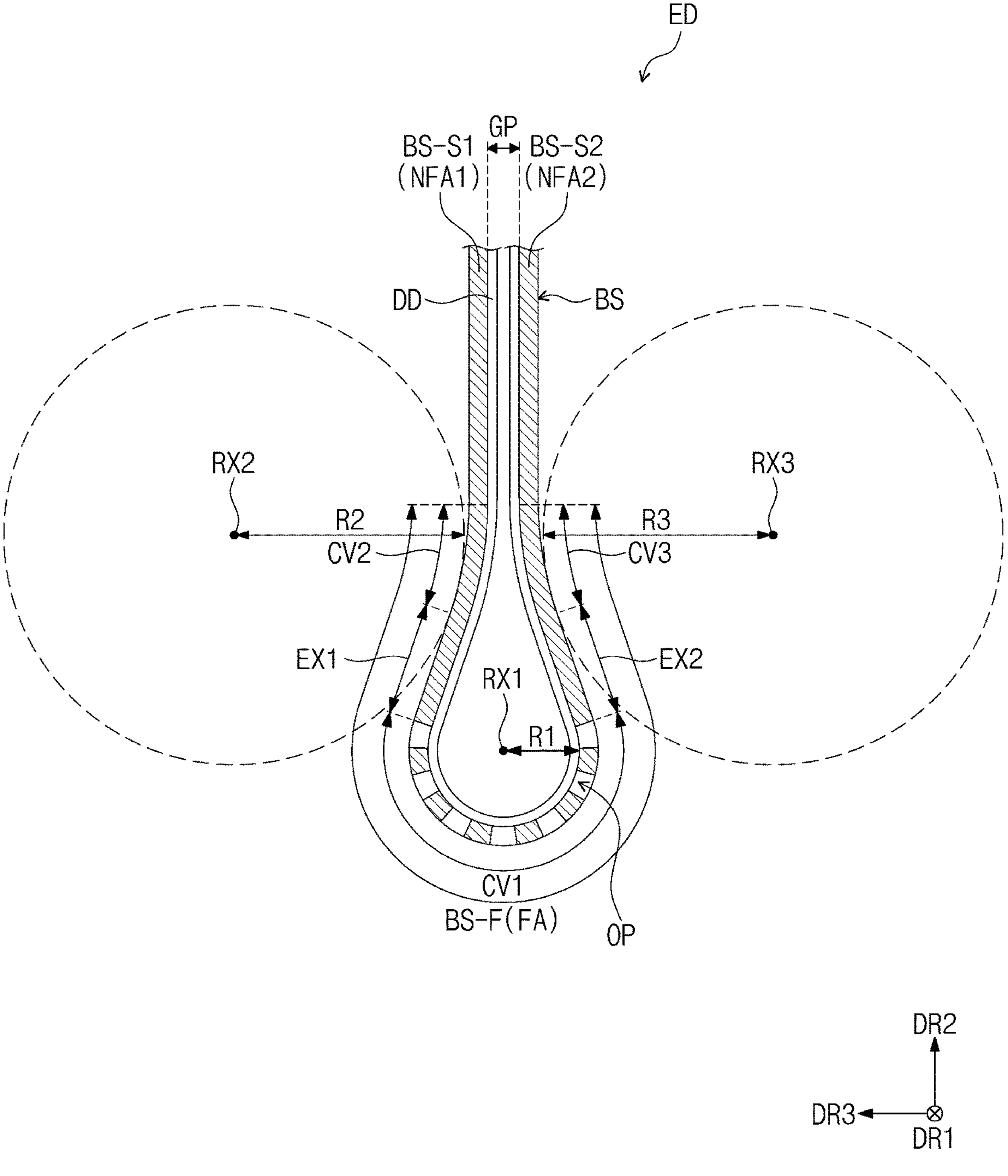
FIG. 10 is a cross-sectional view of an electronic device in a folded state according to an embodiment of the present disclosure.

FIG. 10 is a cross-sectional view of the electronic device ED in a folded state according to an embodiment of the present disclosure. For the convenience of explanation, FIG. 10 schematically shows the cross-section of the substrate BS of the digitizer DGT (refer to FIG. 4) and the display device DD disposed on the digitizer DGT, and other components are omitted. FIG. 10 shows the cross-section of the electronic device ED in the folded state when viewed in the first direction DR1, and an end portion (e.g., a distal end) of each of the first support portion BS-S1 and the second support portion BS-S2 of the substrate BS is illustrated to face upward in FIG. 10.

The folding portion BS-F of the substrate BS overlapping the folding area FA may include a plurality of curved portions including a first curved portion CV1, a second curved portion CV2, a third curved portion CV3, a first extension portion EX1, and a second extension portion EX2, which are provided integrally with each other. The electronic device ED which is folded may define each of the first, second, and third curved portions CV1, CV2, and CV3 being curved with a predetermined curvature in the folding portion BS-F.

The first curved portion CV1 may be disposed at a center of the folding portion BS-F and may be disposed between the first extension portion EX1 and the second extension portion EX2. The first extension portion EX1 may extend from one end of the first curved portion CV1 parallel to the first direction DR1, and the second extension portion EX2 may extend from the other end of the first curved portion CV1 parallel to the first direction DR1. The first extension portion EX1 may be disposed between the first curved portion CV1 and the second curved portion CV2. The second extension portion EX2 may be disposed between the first curved portion CV1 and the third curved portion CV3. A respective extension portion may include an inflection point at which a curve direction of the first curved portion CV1 is changed to the curve direction of a respective curved portion among the second and third curved portions CV2 and CV3.

The second curved portion CV2 may be disposed between the first extension portion EX1 and the first support portion BS-S1. The third curved portion CV3 may be disposed between the second extension portion EX2 and the second support portion BS-S2. A boundary between the second curved portion CV2 and the first support portion BS-S1 may correspond to a boundary between the folding area FA and the first non-folding area NFA1. A boundary between the third curved portion CV3 and the second support portion BS-S2 may correspond to a boundary between the folding area FA and the second non-folding area NFA2.

The openings OP may be defined in the folding portion BS-F. According to an embodiment, the openings OP may be defined in the first curved portion CV1. The openings OP may have a shape extending in the first direction DR1 (e.g., having a major direction in the first direction DR1) as described with reference to FIG. 6B and may be arranged in the first direction DR1 and the second direction DR2. The first curved portion CV1 may be easily folded by the openings OP.

When the substrate BS is folded, the first curved portion CV1 may be curved with respect to a first center of curvature RX1 facing the upper surface of the substrate BS to have a first radius of curvature R1. Each of the second curved portion CV2 and the third curved portion CV3 may be curved in a direction opposite to the first curved portion CV1. As an example, the second curved portion CV2 may be curved with respect to a second center of curvature RX2 facing the lower surface of the substrate BS to have a second radius of curvature R2, and the third curved portion CV3 may be curved with respect to a third center of curvature RX3 facing the lower surface of the substrate BS to have a third radius of curvature R3.

The second curved portion CV2 may be spaced apart from the third curved portion CV3 with the first curved portion CV1 interposed therebetween and may have a shape symmetrical with a shape of the third curved portion CV3. According to an embodiment, the second radius of curvature R2 and the third radius of curvature R3 may have substantially the same value as each other. That is, the second curved portion CV2 and the third curved portion CV3 may be curved to have substantially the same curvature as each other.

According to an embodiment, the first radius of curvature R1 may be smaller than each of the second radius of curvature R2 and the third radius of curvature R3. Since the radius of curvature is inversely proportional to the curvature, the first curved portion CV1 may be curved to have the curvature greater than that of each of the second curved portion CV2 and the third curved portion CV3. As the openings OP are formed through the first curved portion CV1, the first curved portion CV1 may be easily curved compared to the second curved portion CV2 and the third curved portion CV3, and thus, the first curved portion CV1 may be curved with a larger curvature.

When the substrate BS is folded, the first support portion BS-S1 and the second support portion BS-S2 may be maintained in a flat state (e.g., in a single plane). When the substrate BS is folded, the first support portion BS-S1 and the second support portion BS-S2 may face each other. When the substrate BS is folded, a gap GP between the first support portion BS-S1 and the second support portion BS-S2 may be smaller than the first radius of curvature R1. Accordingly, the substrate BS of the digitizer DGT (refer to FIG. 4) may be folded to have the dumbbell shape at the folded end portion of the electronic device ED, when viewed in the cross-section. That is, the substrate BS may have two curvatures between a respective support portion and the folded portion BS-F.

The conductive patterns of the first sensing portion SA1 (refer to FIG. 9A) may be disposed on the first support portion BS-S1. According to an embodiment, some of the conductive patterns of the first sensing portion SA1 (refer to FIG. 9A) may be disposed on the second curved portion CV2 and the first extension portion EX1. The conductive patterns on the first support portion BS-S1 may extend from the first support portion BS-S1 to be on the second curved portion CV2 or on both the second curved portion CV2 and the first extension portion EX1. Accordingly, the first sensing portion SA1 (refer to FIG. 9A) may be disposed to partially overlap the folding area FA. Similarly, the conductive patterns of the second sensing portion SA2 (refer to FIG. 9A) may be disposed on the second support portion BS-S2. According to an embodiment, the conductive patterns of the second sensing portion SA2 (refer to FIG. 9A) may be disposed on the third curved portion CV3 or both the third curved portion CV3 and the second extension portion EX2.

As the substrate BS includes the fiber reinforced composite material, the flexibility of the substrate BS may be improved, and the substrate BS may be easily curved to define the curved portions CV1, CV2, and CV3 variously curved in opposite directions to each other. That is, the digitizer DGT (refer to FIG. 4) may include the substrate BS folded in the dumbbell shape, and thus, the digitizer DGT (refer to FIG. 4) may be folded in the dumbbell shape. In addition, the display device DD disposed on the digitizer DGT (refer to FIG. 4) may be supported by the substrate BS of the digitizer DGT (refer to FIG. 4), which has a predetermined rigidity, and thus, the display device DD may be folded together with the digitizer DGT to correspond to the folding shape of the substrate BS. Accordingly, the electronic device ED may be easily folded in the dumbbell shape even though the electronic device ED does not include a separate support plate between the display device DD and the digitizer DGT (refer to FIG. 4). Accordingly, the configuration of the electronic device ED may be simplified, and the thickness and the manufacturing cost of the electronic device ED may be reduced.

Figure 11A:
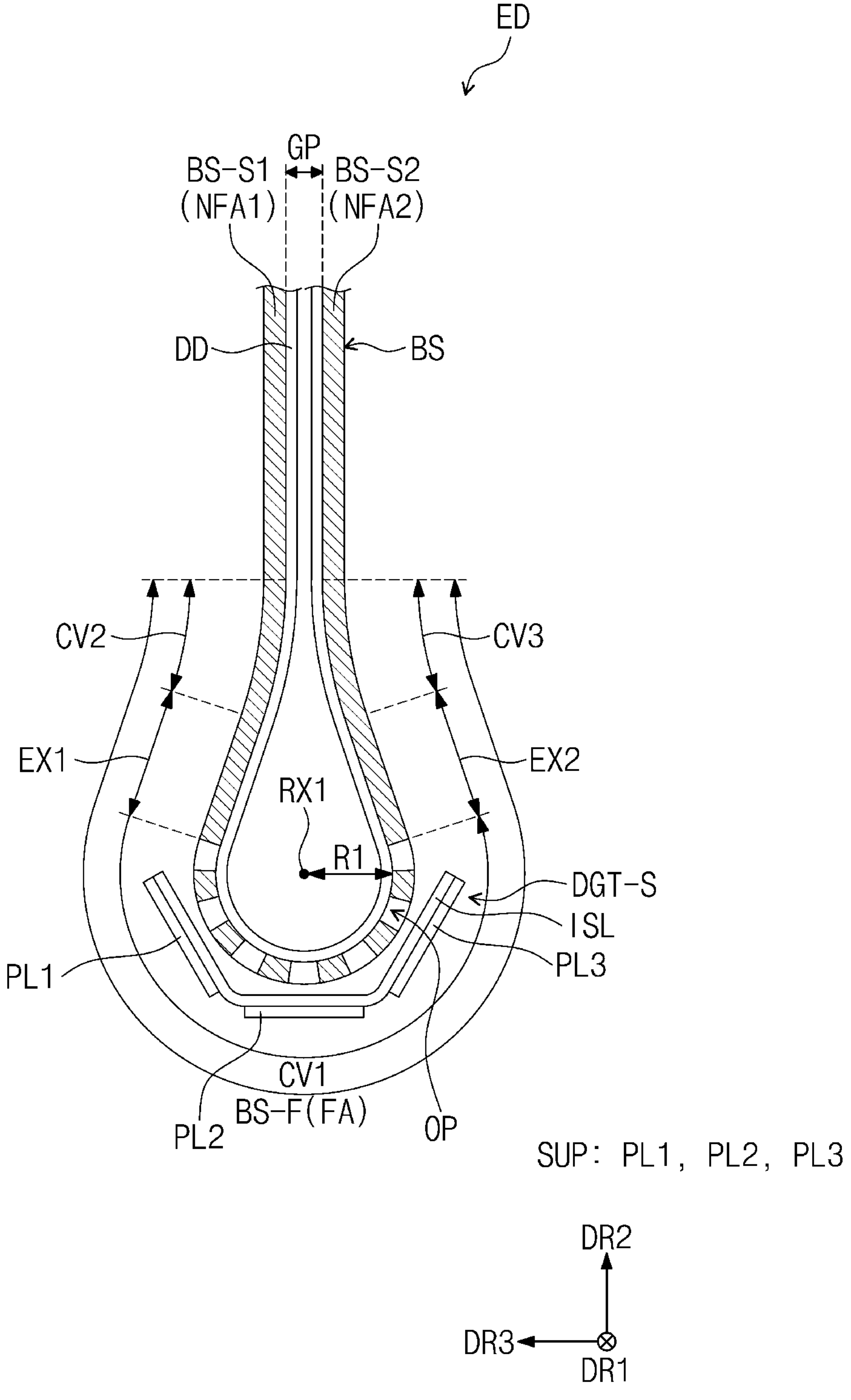
FIGS. 11A to 11C are cross-sectional views of electronic devices in a folded state according to embodiments of the present disclosure.
Figure 11B:
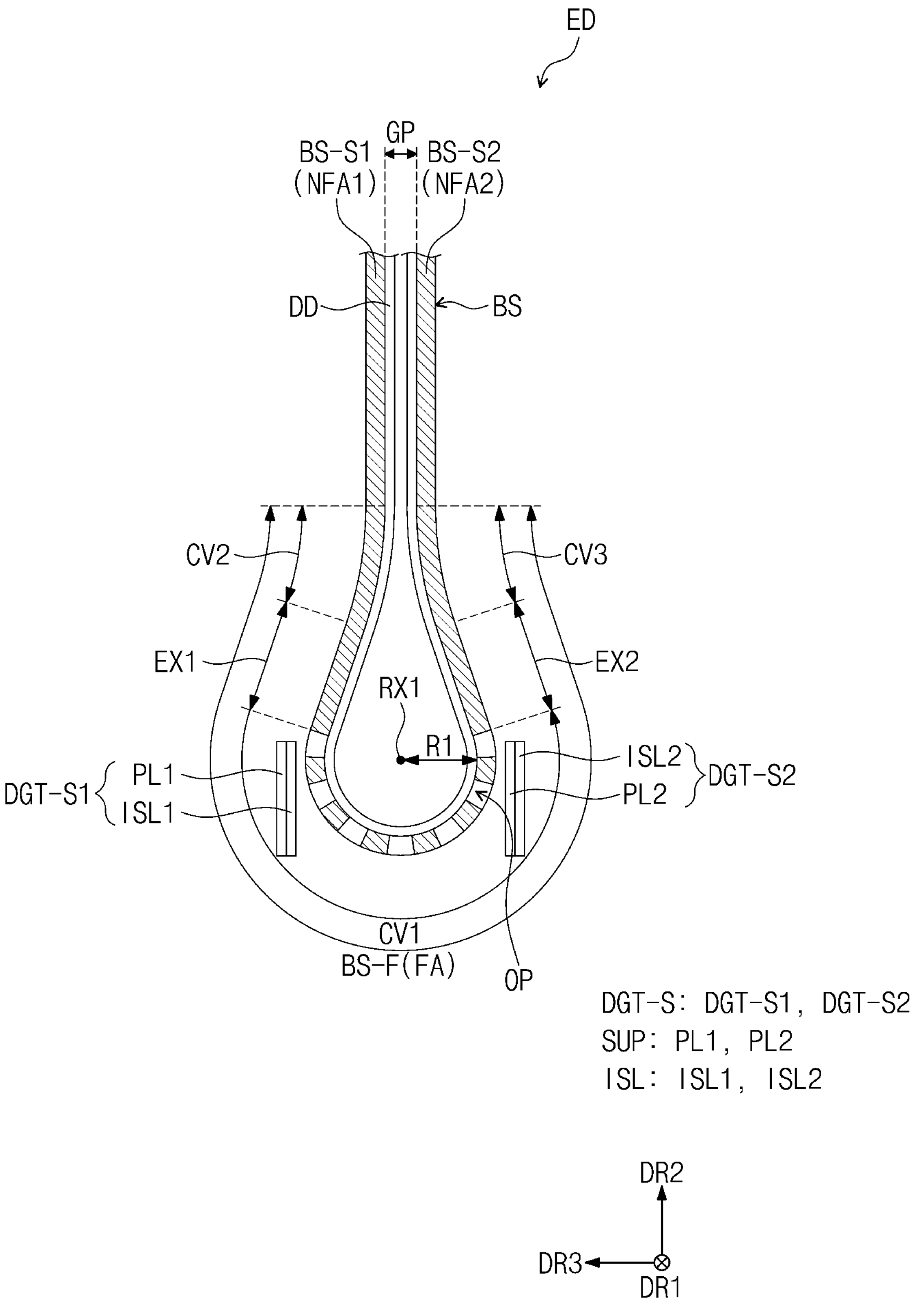
Figure 11C:
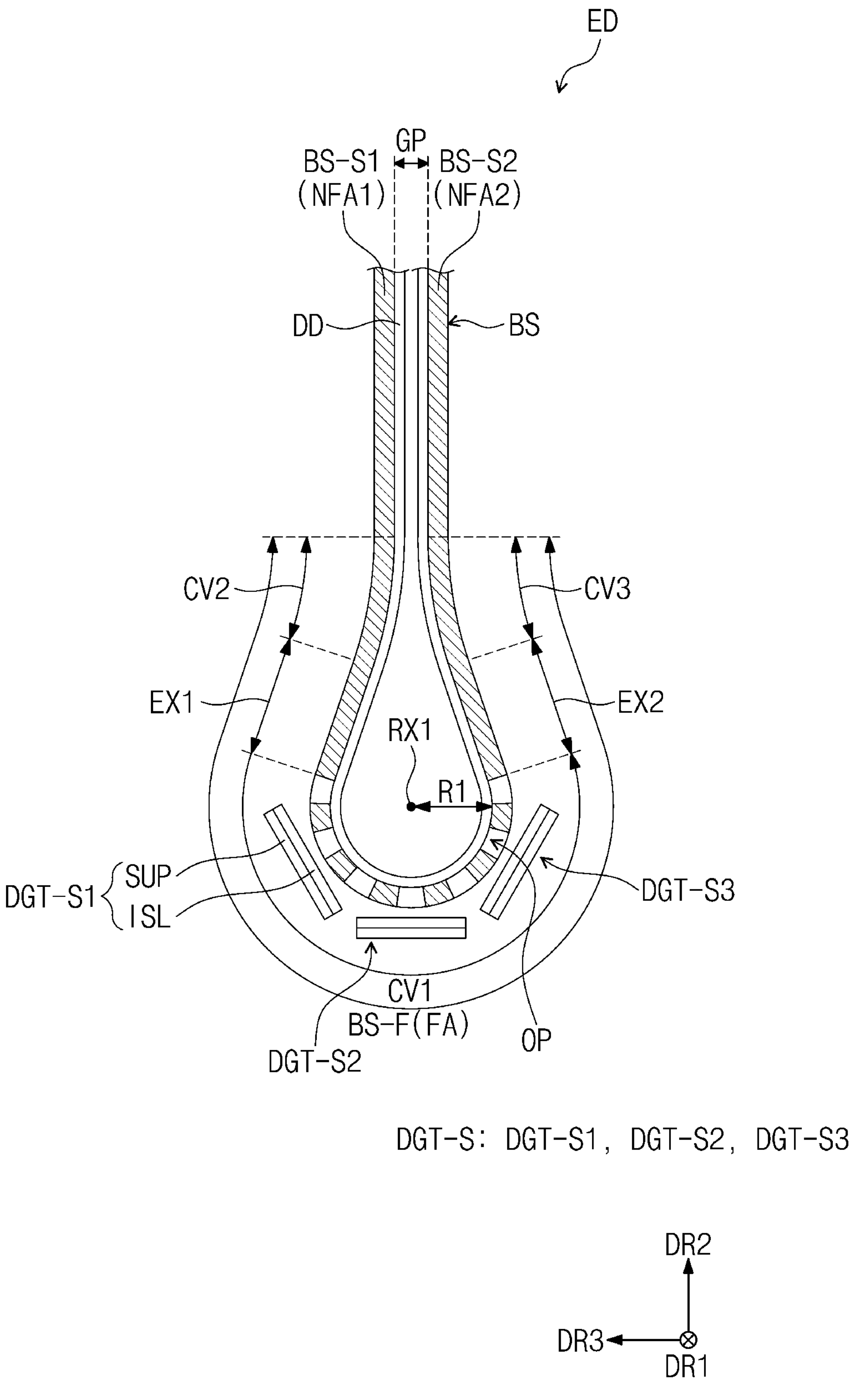

FIGS. 11A to 11C are cross-sectional views of electronic devices ED in a folded state according to embodiments of the present disclosure. The electronic devices ED shown in FIGS. 11A to 11C may include substantially the same structure as that of the electronic device ED shown in FIG. 10 except some components. In FIGS. 11A to 11C, the same reference numerals denote the same elements in FIG. 10, and thus, detailed descriptions of the same elements will be omitted.

Referring to FIGS. 11A to 11C, each electronic device ED may include a sub-digitizer DGT-S. The sub-digitizer DGT-S may be disposed to overlap a folding area FA. According to an embodiment, the sub-digitizer DGT-S may overlap a first curved portion CV1 of a substrate BS of a digitizer DGT (refer to FIG. 4). The sub-digitizer DGT-S may overlap a plurality of openings OP of the substrate BS when viewed in a plane.

According to an embodiment, the sub-digitizer DGT-S may be disposed under the digitizer DGT (refer to FIG. 4), however, should not be limited thereto or thereby. According to an embodiment, the sub-digitizer DGT-S may be disposed on the digitizer DGT (refer to FIG. 4). The sub-digitizer DGT-S may be provided separately from the digitizer DGT (refer to FIG. 4). The sub-digitizer DGT-S may be connected to a set bracket of the electronic device ED and may be accommodated in cases EDC1 and EDC2 (refer to FIG. 2) of the electronic device ED.

The sub-digitizer DGT-S may be driven independently from the digitizer DGT (refer to FIG. 4), however, should not be limited thereto or thereby. According to an embodiment, the sub-digitizer DGT-S may be electrically connected to the digitizer DGT (refer to FIG. 4) and may be driven by one driver.

The sub-digitizer DGT-S may assist the digitizer DGT (refer to FIG. 4) and may increase a sensing sensitivity of the folding area FA. Coils of the digitizer DGT (refer to FIG. 4) may not be disposed on the area in which the openings OP are defined, and the sub-digitizer DGT-S may be disposed to overlap the openings OP to assist the digitizer DGT. As the electronic device ED includes the digitizer DGT (refer to FIG. 4) and the sub-digitizer DGT-S, the sensing sensitivity of the electronic device ED may be improved, and the electronic device ED may be easily folded in the dumbbell shape.

The sub-digitizer DGT-S may include an input sensing layer ISL and a support layer SUP. The input sensing layer ISL of the sub-digitizer DGT-S may include a plurality of coils as the first sensing portion SA1 (refer to FIG. 8). The sub-digitizer DGT-S may be driven in a resonant manner by electromagnetic induction. The support layer SUP may support the input sensing layer ISL.

Referring to FIG. 11A, the input sensing layer ISL may overlap the folding area FA and may be provided in an integral shape. When the electronic device ED is folded, the input sensing layer ISL may be folded with a predetermined curvature. As the sub-digitizer DGT-S includes the sensing layer ISL with the integral shape, the configuration of the electronic device ED may be simplified.

The support layer SUP may include a plurality of plates PL1, PL2, and PL3 to support the input sensing layer ISL with the integral shape. The plates PL1, PL2, and PL3 may be disposed under the input sensing layer ISL and may support the input sensing layer ISL that is folded with the predetermined curvature. A portion of the input sensing layer ISL may be folded with respect to an imaginary folding axis, and the plates PL1, PL2, and PL3 may be arranged in a direction crossing a direction in which the imaginary folding axis extends. As the plates PL1, PL2, and PL3 are disposed spaced apart from each other, the plates PL1, PL2, and PL3 may support the input sensing layer ISL, and the input sensing layer ISL may be easily folded to correspond to a folding shape of the folding area FA.

However, according to an embodiment, the input sensing layer ISL of the sub-digitizer DGT-S may include a plurality of sub-sensing portions ISL1 and ISL2 spaced apart from each other. FIGS. 11B and 11C show the sub-digitizers DGT-S provided in the form of plural sub-sensing portions. The sub-digitizers DGT-S of FIGS. 11B and 11C may include substantially the same configuration except the number of the sub-sensing portions.

Referring to FIG. 11B, an input sensing layer ISL of the sub-digitizer DGT-S may include a first sub-sensing portion ISL1 and a second sub-sensing portion ISL2. Each of the first sub-sensing portion ISL1 and the second sub-sensing portion ISL2 may include a plurality of coils. A support layer SUP of the sub-digitizer DGT-S may include a first plate PL1 and a second plate PL2. The first plate PL1 may support the first sub-sensing portion ISL1, and the second plate PL2 may support the second sub-sensing portion ISL2. In the present disclosure, the first sub-sensing portion ISL1 and the first plate PL1 may be defined as a first auxiliary digitizer DGT-S1.

The first auxiliary digitizer DGT-S1 and a second auxiliary digitizer DGT-S2 may be arranged spaced apart from each other in a direction crossing an extension direction of an imaginary folding axis of the electronic device ED. In the folded state of the electronic device ED, the first auxiliary digitizer DGT-S1 may face the second auxiliary digitizer DGT-S2.

Referring to FIG. 11C, the sub-digitizer DGT-S may include first, second, and third auxiliary digitizers DGT-S1, DGT-S2, and DGT-S3. The first, second, and third auxiliary digitizers DGT-S1, DGT-S2, and DGT-S3 may be arranged spaced apart from each other in a direction crossing a direction in which an imaginary folding axis of the electronic device ED extends. The first, second, and third auxiliary digitizers DGT-S1, DGT-S2, and DGT-S3 may be arranged spaced apart from each other in a direction along the digitizer DGT. In the folded state of the electronic device ED, each of the first, second, and third auxiliary digitizers DGT-S1, DGT-S2, and DGT-S3 may face a folding portion BS-F of a substrate BS. In detail, each of the first, second, and third auxiliary digitizers DGT-S1, DGT-S2, and DGT-S3 may face a first curved portion CV1.

The number of the auxiliary digitizers included in the sub-digitizer DGT-S should not be limited to that shown in FIGS. 11B and 11C. The number of the auxiliary digitizers included in the sub-digitizer DGT-S may be changed depending on a configuration, a structure, a size, and a folding shape of the electronic device ED.

As the input sensing layer ISL includes the sub-sensing portions spaced apart from each other as shown in FIGS. 11B and 11C, the input sensing layer ISL may not be curved with a predetermined curvature when the electronic device ED is folded. That is, the electronic device ED which is folded may dispose the various sub-sensing portions flat. Accordingly, the coils included in the input sensing layer ISL may be prevented from being damaged due to the stress.

Although embodiments of the present disclosure have been described, it is understood that the present disclosure should not be limited to these embodiments but various changes and modifications can be made by one ordinary skilled in the art within the spirit and scope of the present disclosure as hereinafter claimed.

Therefore, the disclosed subject matter should not be limited to any single embodiment described herein, and the scope of the present invention shall be determined according to the attached claims.

What is claimed is:

1. An electronic device comprising:
a display panel comprising a folding area and a non-folding area which is adjacent to the folding area; and
a digitizer which faces the display panel, senses a first external input and is foldable together with the display panel, the digitizer comprising:
a substrate comprising:
a folding portion corresponding to the folding area of the display panel, the folding portion defining a plurality of openings of the substrate corresponding to the folding area of the display panel,
a first sensing portion and a second sensing portion distinguished from each other with the plurality of openings interposed therebetween and individually driven,
a support portion which corresponds to the non-folding area of the display panel, and
a reinforced fiber,
a first conductive pattern layer and a second conductive pattern layer facing each other with the substrate therebetween,
the first conductive pattern layer comprising first conductive patterns respectively corresponding to the first sensing portion and the second sensing portion and electrically disconnected from each other, and
the second conductive pattern layer comprising second conductive patterns respectively corresponding to the first sensing portion and the second sensing portion and electrically disconnected from each other,
wherein
the folding area includes a first curved portion, and a second curved portion and a third curved portion spaced apart from each other with the first curved portion interposed between the second curved portion and the third curved portion, the first curved portion having a greater curvature than the second curved portion and the third curved portion, and
the plurality of openings are overlapped with the first curved portion and are not overlapped with the second curved portion and the third curved portion.

2. The electronic device of claim 1, wherein the substrate further comprises a matrix portion comprising a polymer and the reinforced fiber is in the matrix portion comprising the polymer.

3. The electronic device of claim 2, wherein the substrate further comprises an inorganic material, in the matrix portion.

4. The electronic device of claim 2, wherein the substrate further comprises a black pigment or a black dye, in the matrix portion.

5. The electronic device of claim 1, wherein the substrate comprising the reinforced fiber has a thickness equal to or greater than about 100 micrometers and equal to or smaller than about 300 micrometers.

6. The electronic device of claim 1, wherein the substrate comprising the reinforced fiber has a flexural modulus equal to or greater than about 20 gigapascals and equal to or smaller than about 45 gigapascals.

7. The electronic device of claim 1, wherein the substrate comprises the reinforced fiber provided in plural including:
first reinforced fibers extending in a first direction;
second reinforced fibers extending in a second direction crossing the first direction; and
the first reinforced fibers crossing the second reinforced fibers.

8. The electronic device of claim 7, wherein the substrate comprises:
the first reinforced fibers crossing the second reinforced fibers defining a sub-substrate of the substrate, and
the sub-substrate provided in plural including a plurality of sub-substrates between the first conductive pattern layer and the second conductive pattern layer.

9. The electronic device of claim 1, wherein the plurality of openings of the substrate corresponding to the folding area of the display panel and are arranged in a lattice shape.

10. The electronic device of claim 1, wherein
the digitizer comprises an upper surface closest to the display panel and a lower surface furthest from the display panel, and
the digitizer which is folded at the folding portion disposes the folding portion comprising:
a first curved portion having a first curvature with respect to a first center of curvature facing the upper surface of the digitizer; and
a second curved portion between the first curved portion and the support portion and having a second curvature with respect to a second center of curvature facing the lower surface of the digitizer.

11. The electronic device of claim 10, wherein the first curvature is greater than the second curvature.

12. The electronic device of claim 1, wherein the digitizer further comprises:

a first insulating layer covering the first conductive pattern layer, the first insulating layer disconnected at the folding portion, and a second insulating layer covering the second conductive pattern layer, the second insulating layer disconnected at the folding portion.

13. The electronic device of claim 1, wherein the digitizer further comprises:

a first insulating layer covering the first conductive pattern layer, the first insulating layer defining a plurality of first insulating openings respectively corresponding to the plurality of openings of the substrate; and a second insulating layer covering the second conductive pattern layer, the second insulating layer defining a plurality of second insulating openings respectively corresponding to the plurality of openings of the substrate.

14. The electronic device of claim 1, further comprising a sub-digitizer which is spaced apart from the digitizer, faces the folding portion of the digitizer and senses the first external input.

15. The electronic device of claim 1, further comprising an input sensing layer which faces the digitizer and senses a second external input different from the first external input.

16. An electronic device comprising:

a display panel comprising a folding area and a non-folding area which is adjacent to the folding area;

a digitizer which faces the display panel and is foldable together with the display panel, the digitizer comprising:

a substrate comprising a reinforced fiber, the substrate defining a plurality of openings corresponding to the folding area of the display panel;

a first sensing portion and a second sensing portion distinguished from each other with the plurality of openings interposed therebetween and individually driven;

a first conductive pattern layer and a second conductive pattern layer facing each other with the substrate comprising the reinforced fiber therebetween;

the first conductive pattern layer comprising first conductive patterns respectively corresponding to the first sensing portion and the second sensing portion and electrically disconnected from each other; and the second conductive pattern layer comprising second conductive patterns respectively corresponding to the first sensing portion and the second sensing portion and electrically disconnected from each other; and a sub-digitizer which faces the folding area of the display panel with the digitizer therebetween and is spaced apart from the digitizer, the sub-digitizer comprising an input sensing layer and a support layer which supports the input sensing layer, wherein the folding area includes a first curved portion, and a second curved portion and a third curved portion spaced apart from each other with the first curved portion interposed between the second curved portion and the third curved portion, the first curved portion has a greater curvature than the second curved portion and the third curved portion, and the sub-digitizer is overlapped with the first curved portion, and is not overlapped with the second curved portion and the third curved portion.

17. The electronic device of claim 16, wherein the support layer comprises a plurality of plates spaced apart from each other along the input sensing layer.

18. The electronic device of claim 16, wherein the sub-digitizer is provided in plural including a plurality of auxiliary digitizers spaced apart from each other along the folding area.

19. The electronic device of claim 16, wherein the digitizer which is folded defines a plurality of curved portions arranged along the folding area of the display panel, the plurality of curved portions having different curvatures from each other.

20. The electronic device of claim 16, wherein, the sub-digitizer corresponds to the plurality of openings of the substrate.

* * * * *